United States Patent

Nishizawa et al.

(10) Patent No.: US 12,243,264 B2
(45) Date of Patent: Mar. 4, 2025

(54) ESTIMATION DEVICE AND METHOD

(71) Applicant: KABUSHIKI KAISHA TOSHIBA, Tokyo (JP)

(72) Inventors: Naoki Nishizawa, Kawasaki Kanagawa (JP); Akihito Seki, Yokohama Kanagawa (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 497 days.

(21) Appl. No.: 17/678,088

(22) Filed: Feb. 23, 2022

(65) Prior Publication Data

US 2023/0061831 A1 Mar. 2, 2023

(30) Foreign Application Priority Data

Sep. 1, 2021 (JP) .................................. 2021-142611

(51) Int. Cl.
*G06T 7/73* (2017.01)
*G06T 7/00* (2017.01)
*G06T 7/593* (2017.01)

(52) U.S. Cl.
CPC .............. *G06T 7/74* (2017.01); *G06T 7/0002* (2013.01); *G06T 7/593* (2017.01);
(Continued)

(58) Field of Classification Search
CPC . G06T 2207/10012; G06T 2207/10032; G06T 2207/20081; G06T 2207/20084;
(Continued)

(56) References Cited

U.S. PATENT DOCUMENTS

2015/0302589 A1 10/2015 Sasaki
2019/0007670 A1 1/2019 Sakurai et al.
(Continued)

FOREIGN PATENT DOCUMENTS

JP 2015207090 A 11/2015
JP 2019011971 A 1/2019
(Continued)

OTHER PUBLICATIONS

Japanese Decision to Grant a Patent (and an English language translation thereof) dated Jul. 30, 2024, issued in counterpart Japanese Application No. 2021-142611.
(Continued)

*Primary Examiner* — Zhiyu Lu
(74) *Attorney, Agent, or Firm* — Holtz, Holtz & Volek PC

(57) ABSTRACT

According to one embodiment, an estimation device includes a processor. The processor is configured to acquire first and second images including a same subject continuously captured by a capture device installed in a mobile object, acquire a first distance to the subject included in the
(Continued)

acquired first image and uncertainty of the first distance, extract a useful second distance from the acquired first distance based on the acquired uncertainty of the first distance, and estimate a position and orientation of the mobile object when the second image is captured by the capture device based on the acquired first and second images, and the extracted second distance.

20 Claims, 17 Drawing Sheets

(52) U.S. Cl.
CPC ............ *G06T 2207/10012* (2013.01); *G06T 2207/10032* (2013.01); *G06T 2207/20081* (2013.01); *G06T 2207/20084* (2013.01); *G06T 2207/30168* (2013.01)

(58) Field of Classification Search
CPC . G06T 2207/30168; G06T 2207/30244; G06T 7/0002; G06T 7/593; G06T 7/70; G06T 7/74

See application file for complete search history.

(56) References Cited

U.S. PATENT DOCUMENTS

| | | | |
|---|---|---|---|
| 2019/0080481 A1* | 3/2019 | Yamaguchi | ............... G06T 5/73 |
| 2020/0294260 A1 | 9/2020 | Kashiwagi et al. | |
| 2022/0067961 A1 | 3/2022 | Tazoe et al. | |

FOREIGN PATENT DOCUMENTS

| | | |
|---|---|---|
| JP | 2019049457 A | 3/2019 |
| JP | 2020148483 A | 9/2020 |
| JP | 2022039719 A | 3/2022 |

OTHER PUBLICATIONS

Mur-Artal, et al., "ORB-SLAM2: An Open-Source SLAM System for Monocular, Stereo, and RGB-D Cameras", IEEE Transactions on Robotics (vol. 33, No. 5), 2017, pp. 1255-1262.

Rublee, et al., "ORB: an efficient alternative to SIFT or SURF", 2011 International Conference on Computer Vision, 2011, pp. 2564-2571.

* cited by examiner

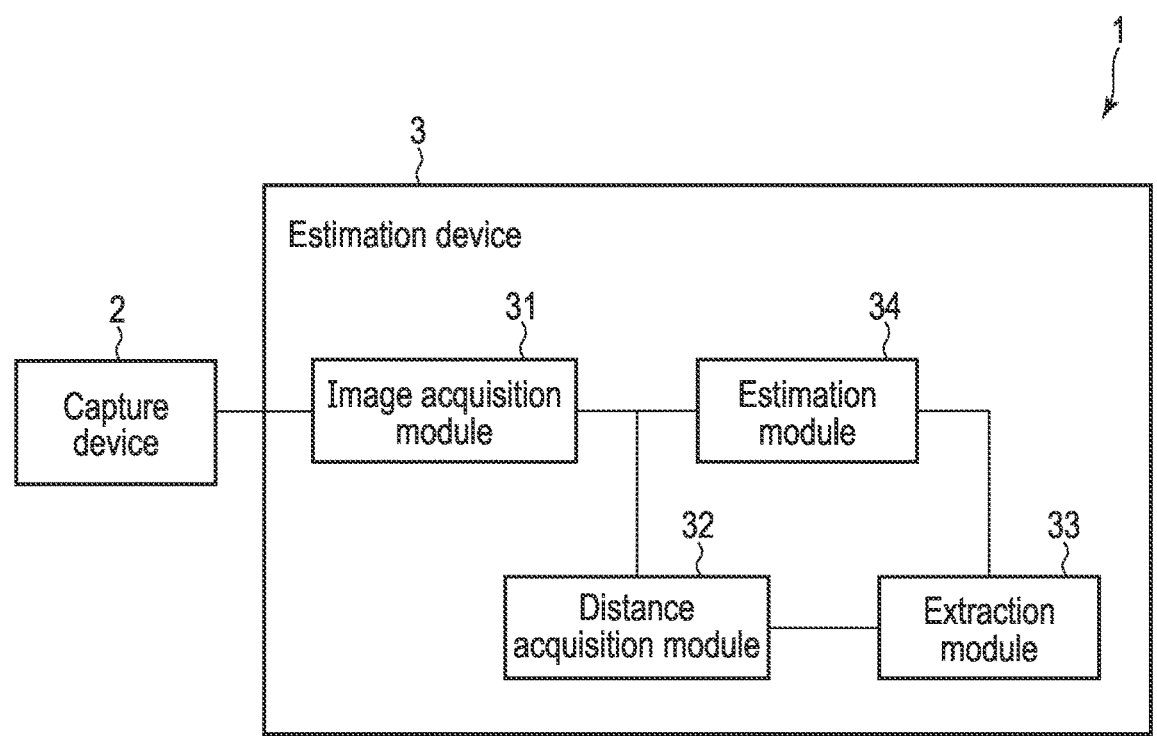
F I G. 1
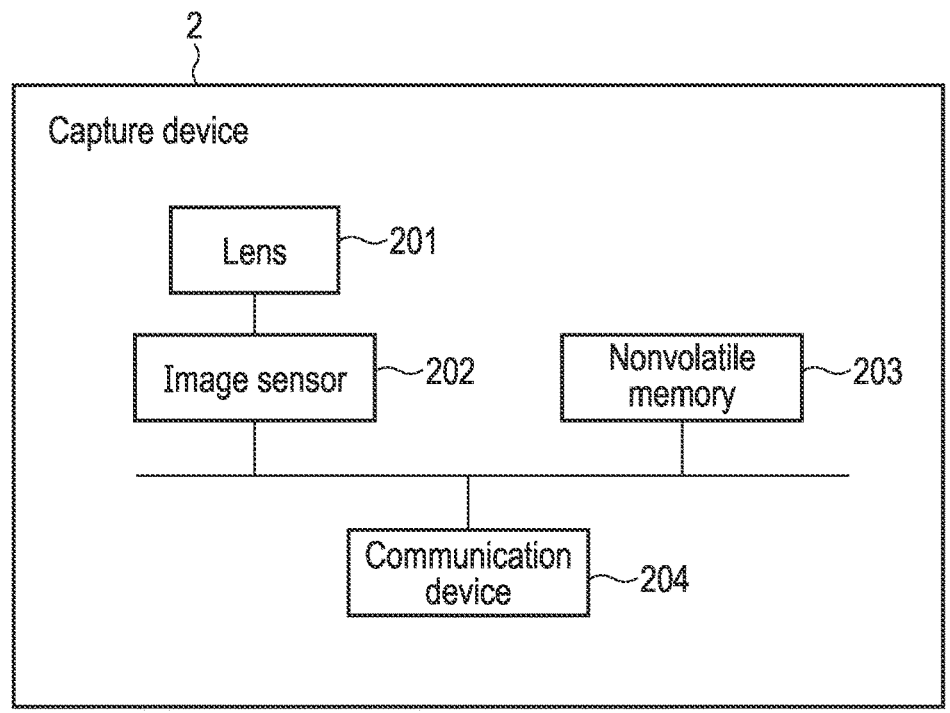
F I G. 2

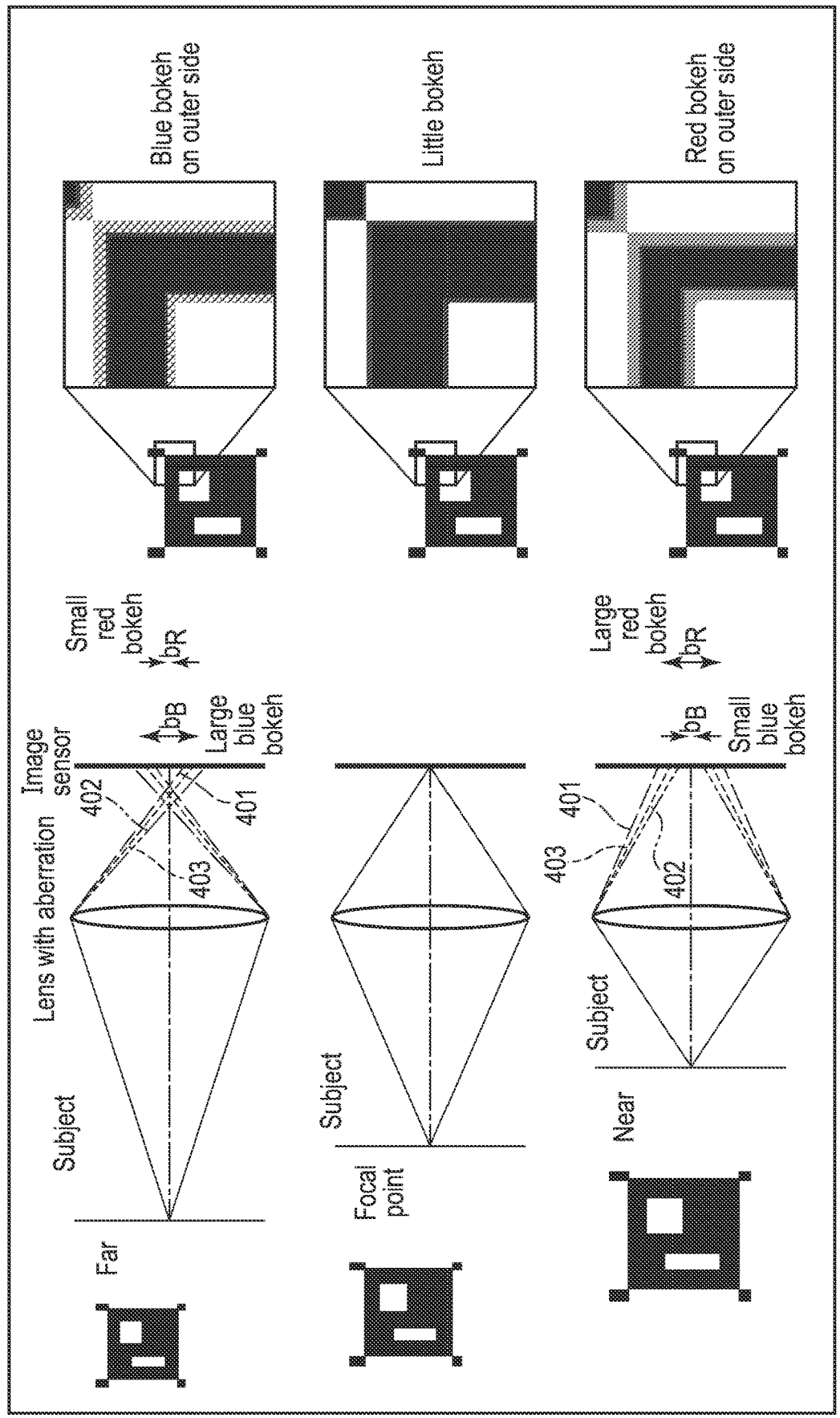
F I G. 5

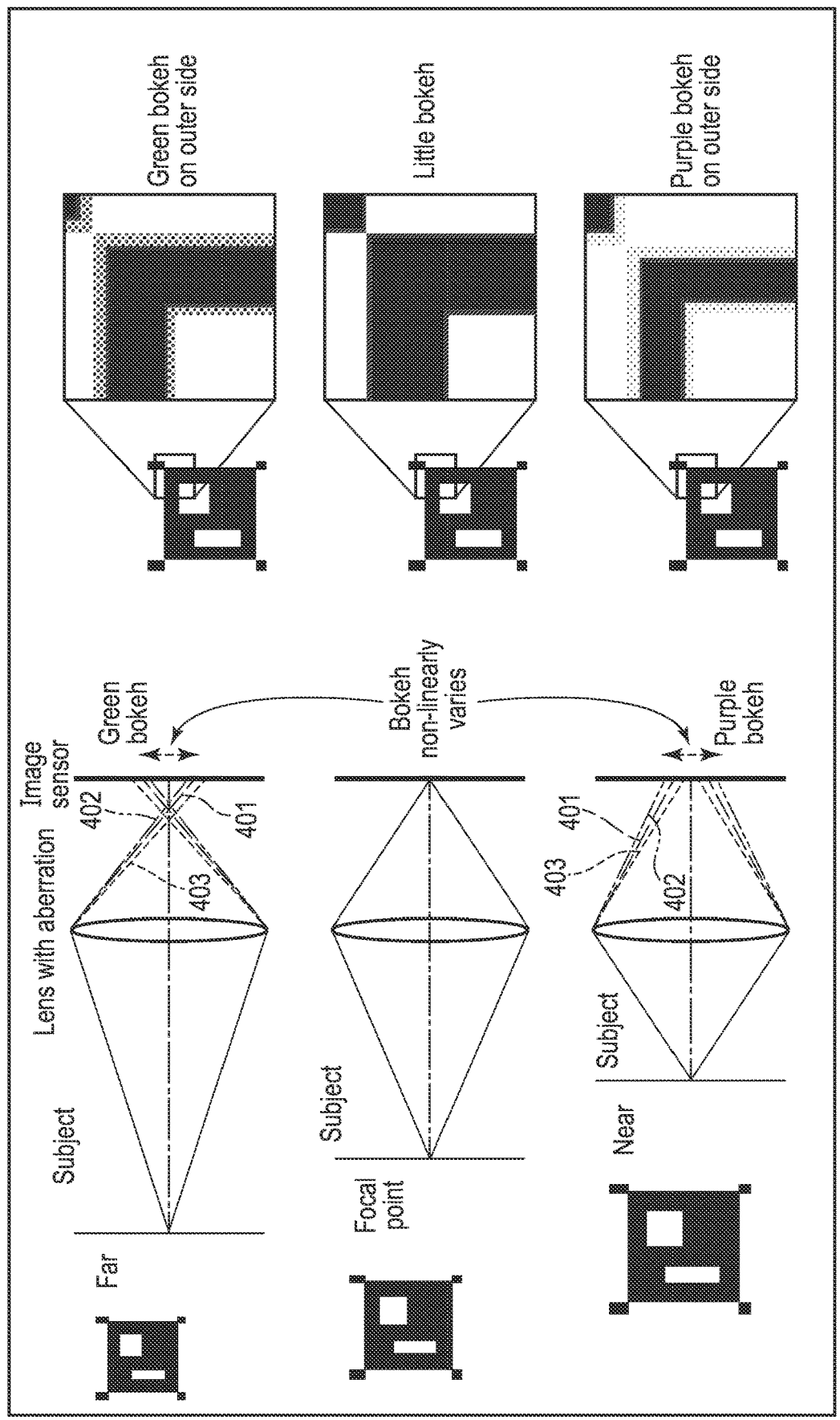
F I G. 6

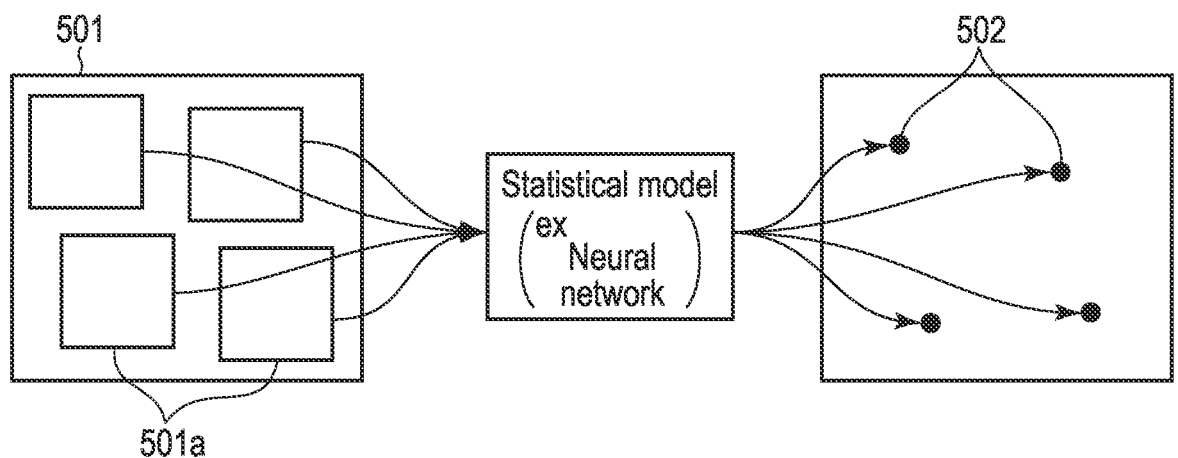
F I G. 11
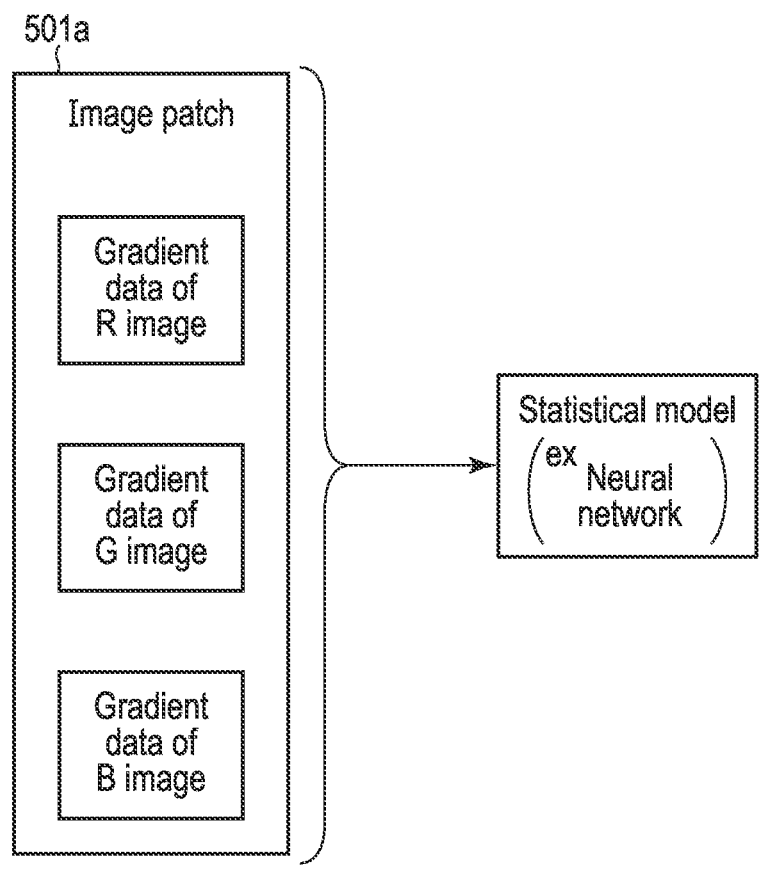
F I G. 12

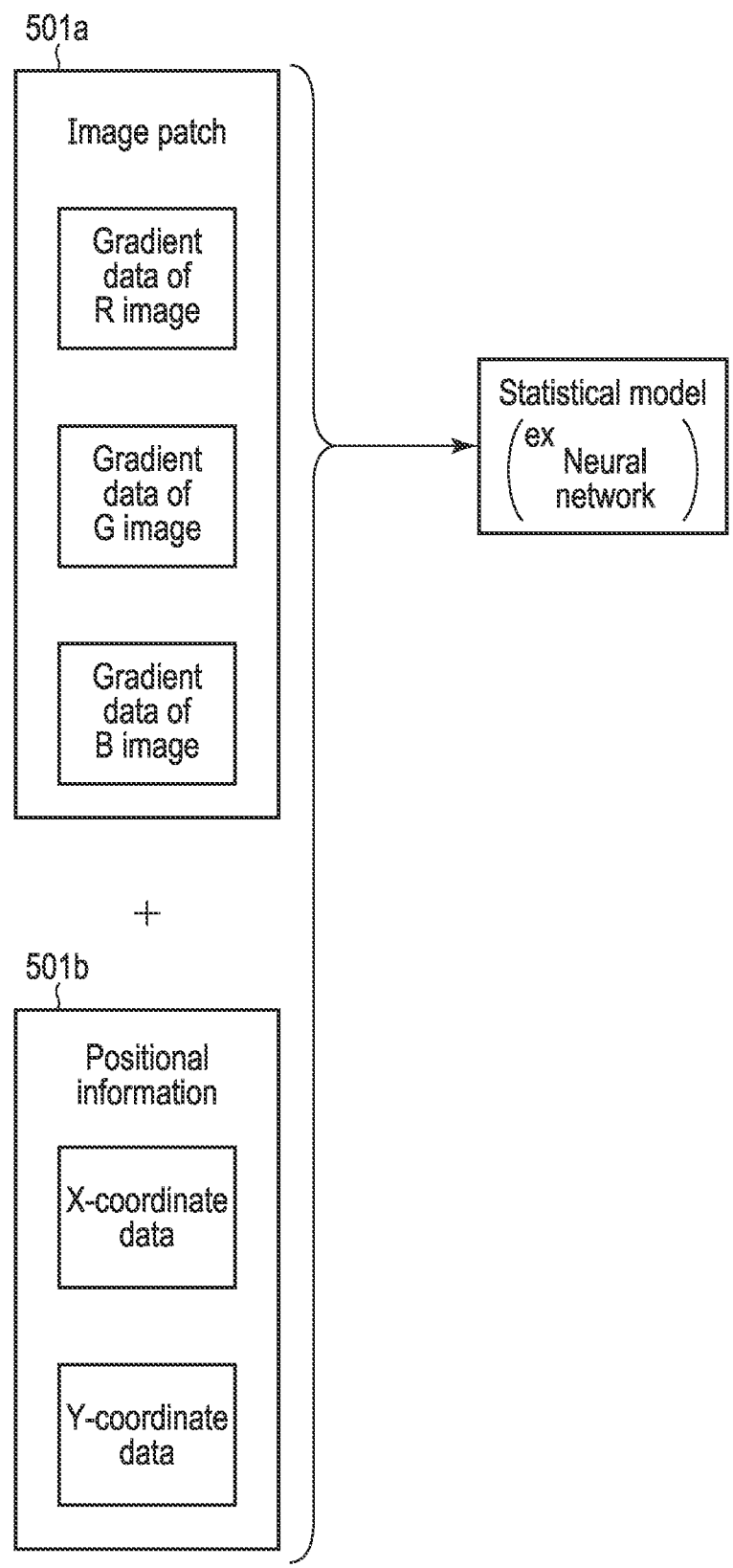
F I G. 14

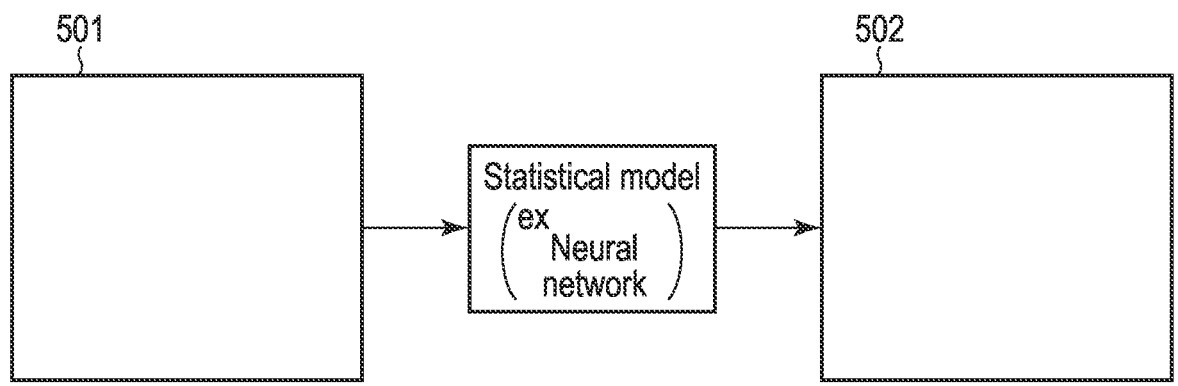
F I G. 15

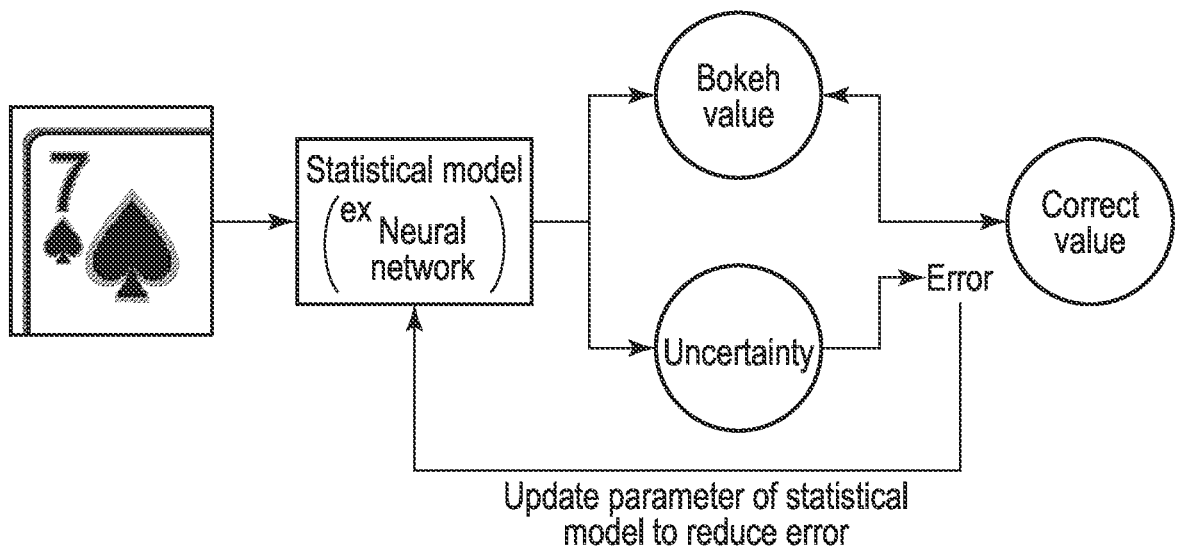
F I G. 17
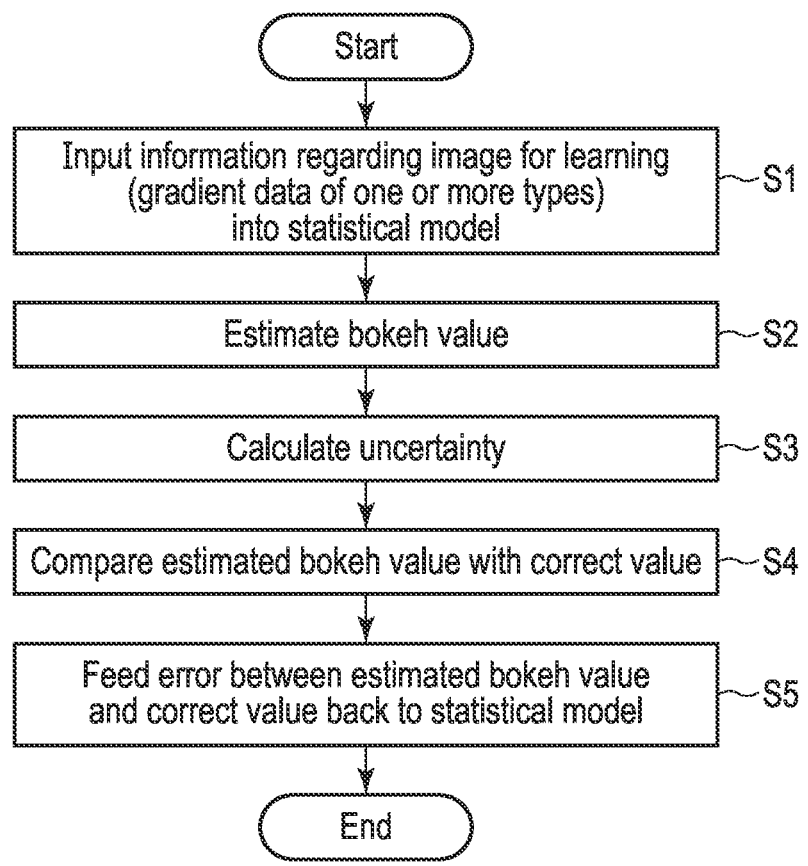
F I G. 18

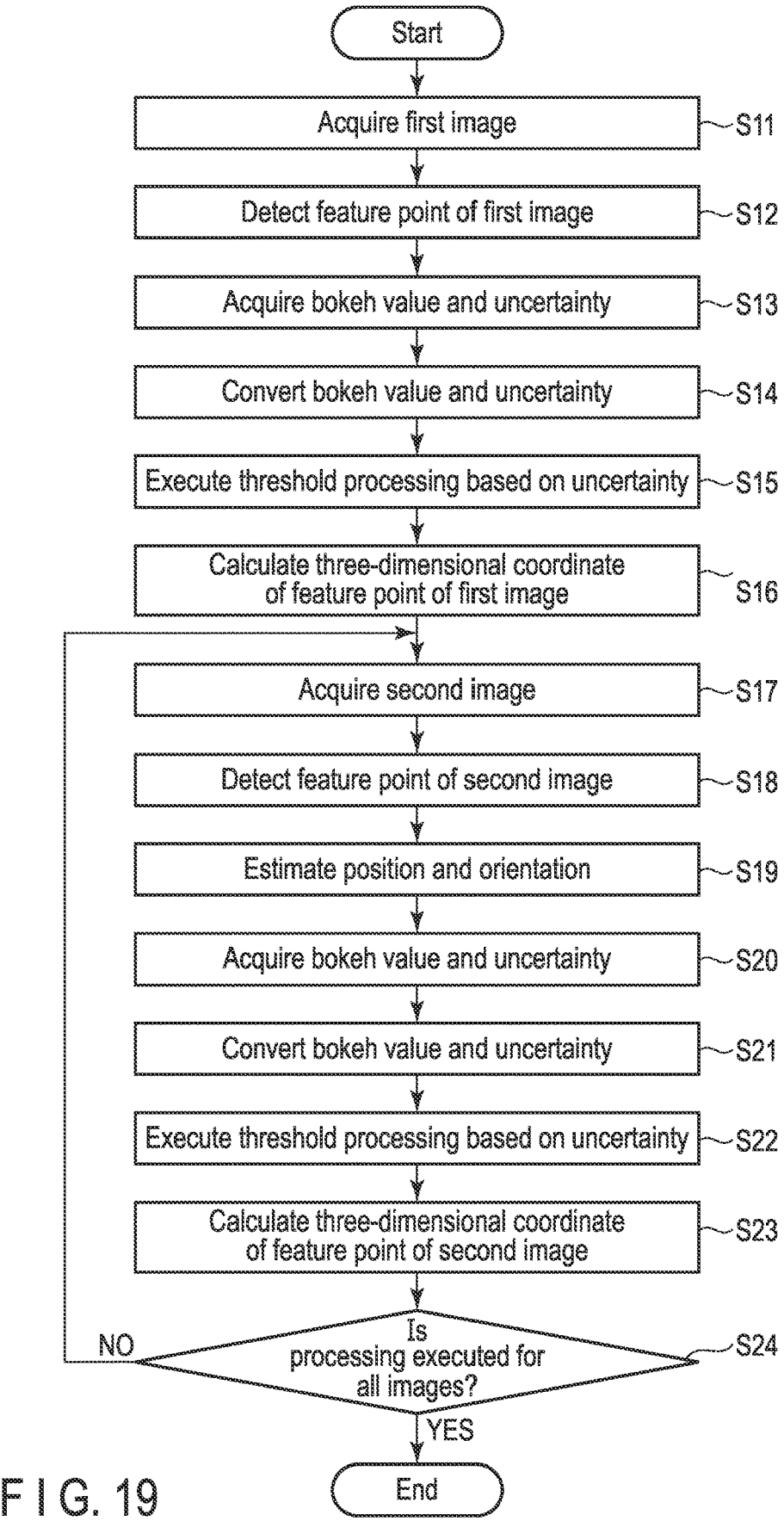
F I G. 19

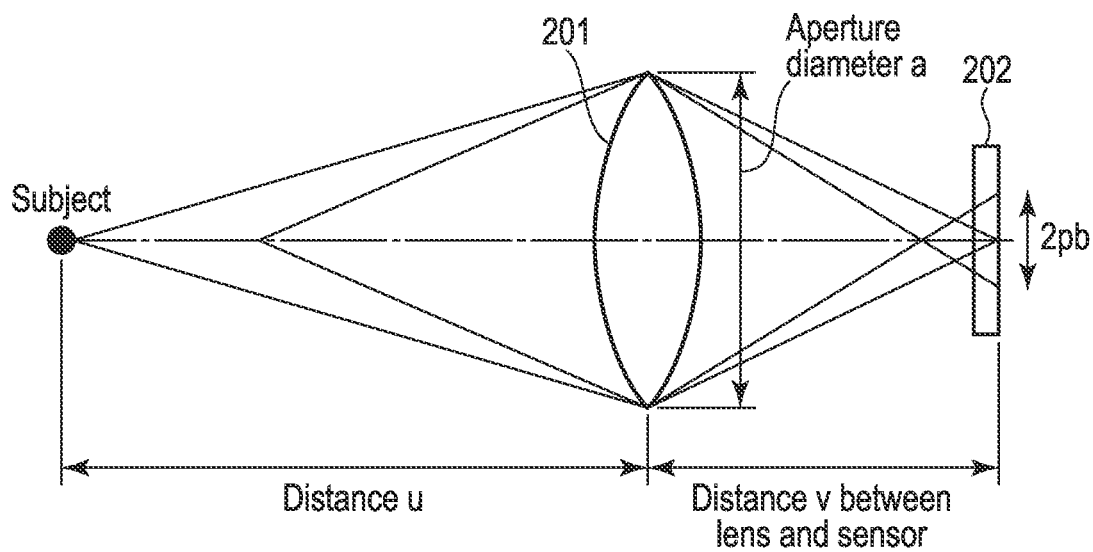
F I G. 20
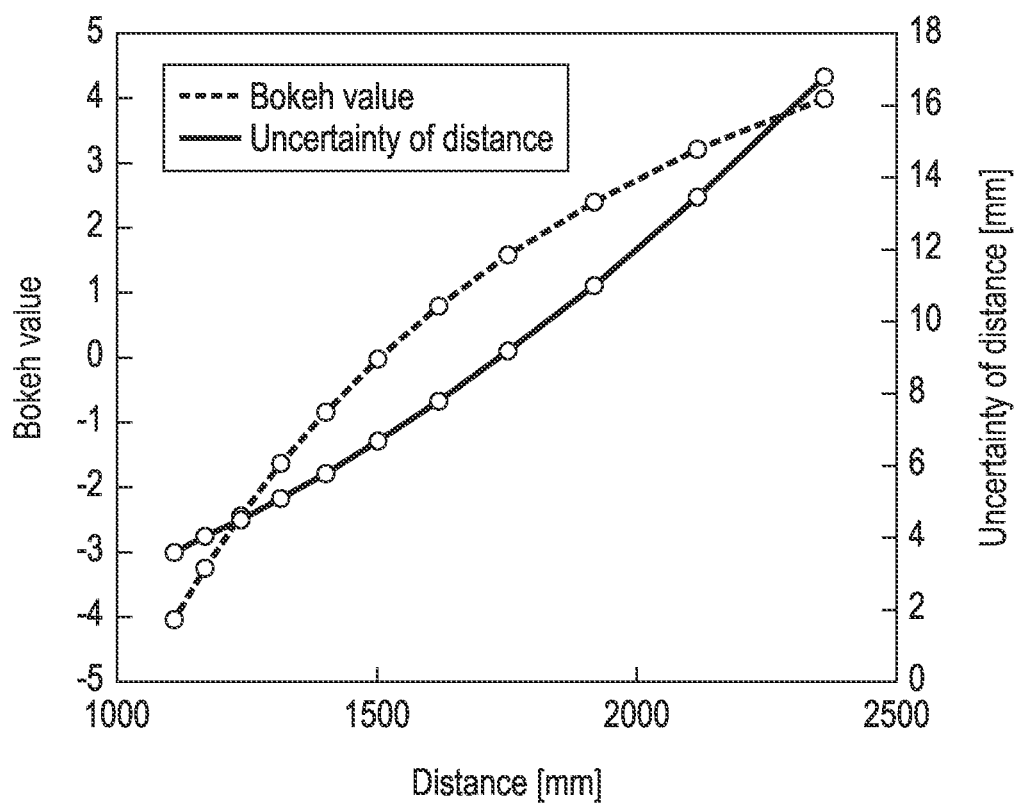
F I G. 21

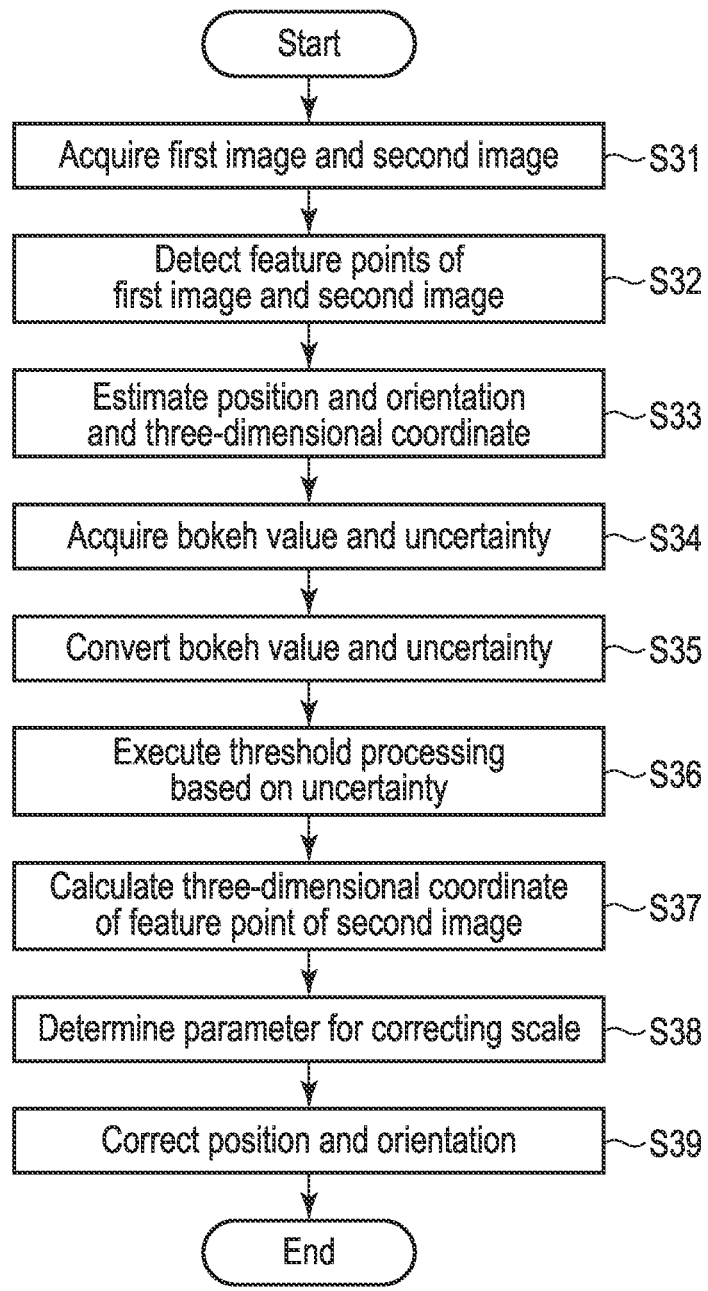
F I G. 22

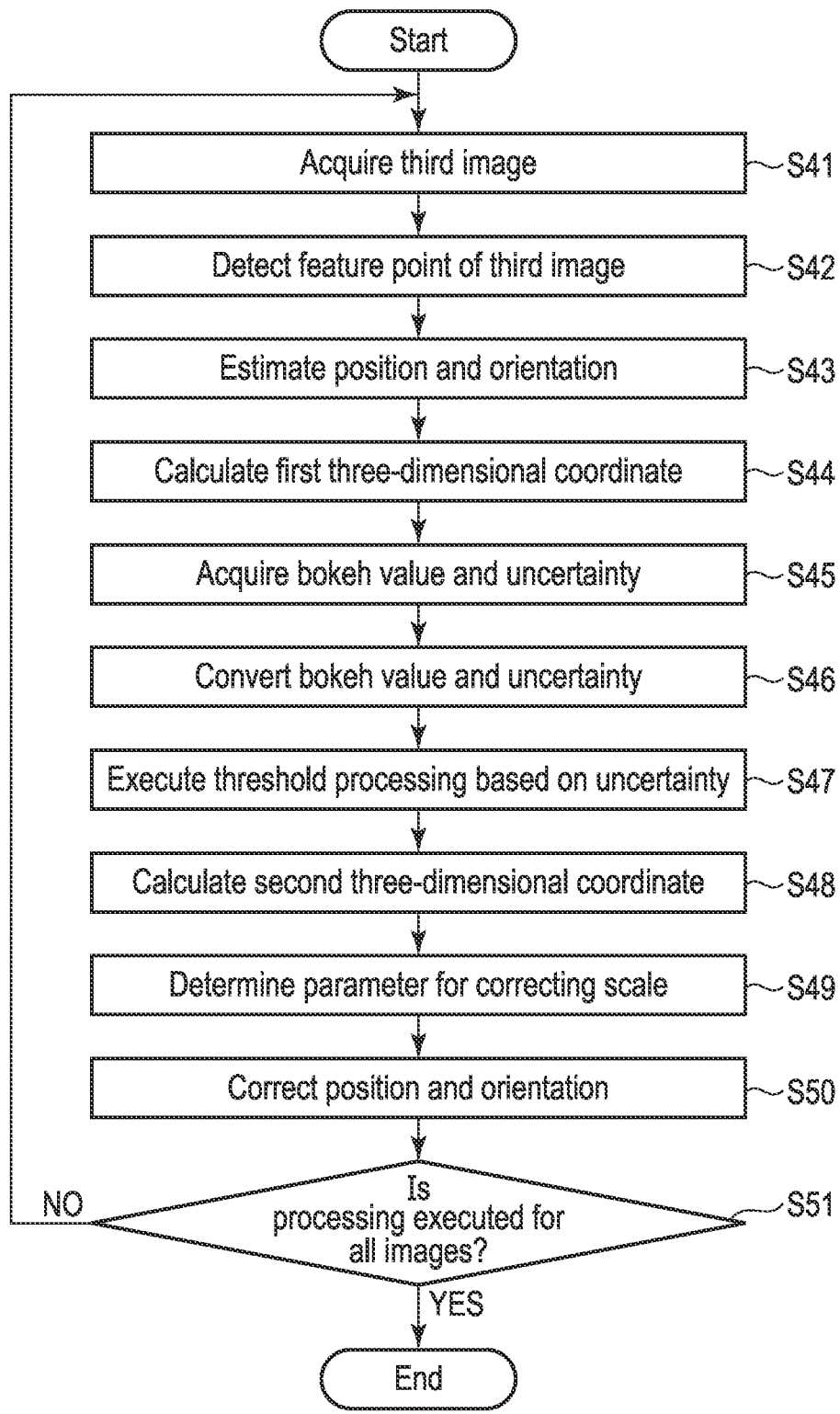
F I G. 23

ESTIMATION DEVICE AND METHOD

CROSS-REFERENCE TO RELATED APPLICATIONS

This application is based upon and claims the benefit of priority from Japanese Patent Application No. 2021-142611, filed Sep. 1, 2021, the entire contents of which are incorporated herein by reference.

FIELD

Embodiments described herein relate generally to an estimation device and a method.

BACKGROUND

In recent years, for example, a technique called simultaneous localization and mapping (SLAM) for simultaneously estimating a position and orientation of a mobile object and creating a three-dimensional map around the mobile object based on an image captured by a capture device (for example, a camera) installed in the mobile object such as an automobile and a robot is known.

However, particularly in the SLAM using an image captured by a monocular capture device, since a scale regarding the estimated position and orientation of the mobile object (and the created three-dimensional map) is indeterminate, scale drift occurs in which errors are accumulated each time processing is executed.

In order to reduce influence of such a scale drift, for example, it is useful to acquire a distance based on a real scale from the mobile body to a subject included in the image described above and estimate the position and orientation of the mobile object by using the estimated distance. However, in a case where accuracy of the distance based on the real scale is low, estimation accuracy of the position and orientation of the mobile body decreases.

BRIEF DESCRIPTION OF THE DRAWINGS

FIG. 1 is a diagram illustrating an exemplary configuration of an estimation system according to a first embodiment.

FIG. 2 is a diagram illustrating an exemplary configuration of hardware of a capture device.

FIG. 5 is a diagram illustrating a relationship between a distance to a subject and bokeh that occurs in an image due to chromatic aberration in a case where a single lens is used.

FIG. 6 is a diagram illustrating a relationship between a distance to a subject and bokeh that occurs in an image due to chromatic aberration in a case where an achromatic lens is used.

FIG. 11 is a diagram for describing a first method of estimating bokeh from an image.

FIG. 12 is a diagram illustrating exemplary information to be input into a statistical model in the first method.

FIG. 14 is a diagram illustrating exemplary information to be input into a statistical model in the second method.

FIG. 15 is a diagram for describing a third method of estimating bokeh from an image.

FIG. 17 is a diagram for describing an exemplary learning process of a statistical model.

FIG. 18 is a flowchart illustrating an exemplary processing procedure of the learning process of the statistical model.

FIG. 19 is a flowchart illustrating an exemplary processing procedure of an estimation device when estimating a position and orientation of a mobile object.

FIG. 20 is a diagram illustrating a relationship between a bokeh value and a distance based on a perspective projection model.

FIG. 21 is a diagram illustrating a relationship between a bokeh value and a distance corresponding to the bokeh value, and a relationship between the distance and uncertainty of the distance.

FIG. 22 is a flowchart illustrating an exemplary initialization processing according to a second embodiment.

FIG. 23 is a flowchart illustrating an exemplary tracking processing according to the present embodiment.

DETAILED DESCRIPTION

Figure 3:
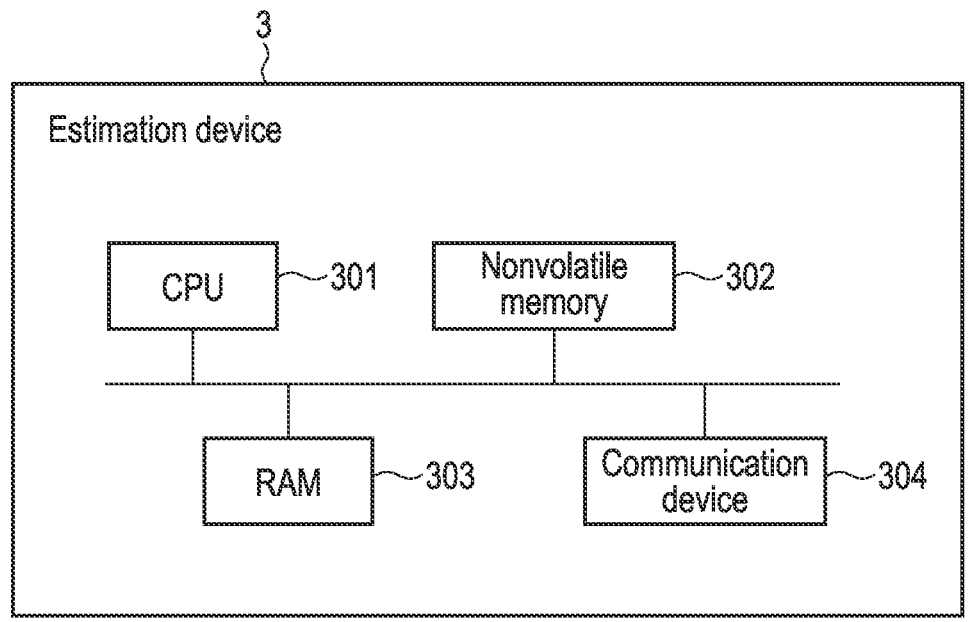
FIG. 3 is a diagram illustrating an exemplary configuration of hardware of an estimation device.

In general, according to one embodiment, an estimation device includes a processor. The processor is configured to acquire first and second images including a same subject continuously captured by a capture device installed in a mobile object, acquire a first distance to the subject included in the acquired first image and uncertainty of the first distance, extract a useful second distance from the acquired first distance based on the acquired uncertainty of the first distance, and estimate a position and orientation of the mobile object when the second image is captured by the capture device based on the acquired first and second images, and the extracted second distance.

Various embodiments will be described hereinafter with reference to the accompanying drawings.

First Embodiment

First, a first embodiment will be described. FIG. 1 is a diagram illustrating an exemplary configuration of an estimation system according to the present embodiment. As illustrated in FIG. 1, an estimation system 1 includes a capture device 2 and an estimation device 3.

The capture device 2 is a monocular camera installed in a mobile object (not illustrated), and for example, continuously captures a plurality of images (hereinafter, referred to as time-series images) while the mobile object moves.

Note that, as the mobile object in the present embodiment, for example, an unmanned aerial vehicle (flying object) such as an automobile, a robot, or a drone is assumed, but another mobile object may be used as long as the mobile object autonomously moves.

The estimation device 3 estimates, from the time-series images captured by the capture device 2, a position and orientation of the mobile object in which the capture device 2 is installed. Note that the position and orientation of the mobile body in the present embodiment correspond to, for example, the position and orientation of the mobile object (that is, a moving distance and direction of the mobile object) from a position serving as a starting point.

The estimation device 3 is communicably connected to the capture device 2, and includes an image acquisition module 31, a distance acquisition module 32, an extraction module 33, and an estimation module 34.

The image acquisition module 31 acquires time-series images captured by the capture device 2. Note that, as described above, for example, since the time-series images are continuously captured while the mobile object is moving, the same subject is included in at least two images close to each other in time series manner among the time-series images.

The distance acquisition module 32 acquires an image (hereinafter, referred to as a first image) among the time-series images acquired by the image acquisition module 31, and acquires a distance to the subject included in the first image and uncertainty of the distance. Note that in the present embodiment, a distance between a plane including a lens aperture plane of the capture device 2 and a subject represented by a point in a three-dimensional space is referred to as a distance to the subject or simply a distance. This distance is a scalar quantity having a length dimension, and is expressed as a numerical value with a unit of length such as meter in a case of being based on a real scale.

Here, the distance acquisition module 32 holds in advance a statistical model used for acquiring the distance to the subject and the uncertainty of the distance from the image captured by the capture device 2. This statistical model is generated by learning bokeh that occurs in an image affected by an aberration of an optical system of the capture device 2 to be described later and varies non-linearly in accordance with the distance to the subject included in the image, and is constructed so as to estimate a bokeh value indicating the bokeh that occurs in the subject in the image and calculate uncertainty (degree of uncertainty) of the bokeh value (that is, the bokeh value and the uncertainty of the bokeh value are output) when the image is input.

Note that the statistical model described above can be generated by application of various known machine learning algorithms, such as a neural network and a random forest. Examples of the neural network applicable in the present embodiment may include a convolutional neural network (CNN), a fully connected neural network, and a recurrent neural network.

According to such a statistical model, for example, the distance acquisition module 32 can acquire the bokeh value output from the statistical model and the uncertainty of the bokeh value by inputting the first image to the statistical model.

Here, although the details will be described later, since the bokeh indicated by the bokeh value output from the statistical model is a physical clue regarding the distance to the subject in which the bokeh occurs, the distance acquisition module 32 converts the acquired bokeh value into a distance (distance to the subject) corresponding to the bokeh value. Further, the distance acquisition module 32 converts the acquired uncertainty of the bokeh value into the uncertainty of the distance corresponding to the bokeh value. As a result, the distance acquisition module 32 acquires the distance to the subject included in the first image and the uncertainty of the distance.

The extraction module 33 extracts a useful distance from among the distances acquired by the distance acquisition module 32 based on the uncertainty of the distance acquired by the distance acquisition module 32.

Based on the first image described above, an image close to the first image in time series manner (hereinafter, referred to as a second image), and the useful distance extracted by the extraction module 33, the estimation module 34 estimates a position and orientation of the mobile object when the second image is captured by the capture device 2. Note that the position and orientation of the mobile object when the first image is captured and the position and orientation of the mobile object when the second image is captured are different from each other, but the second image is an image including the same subject as that of the first image.

That is, the estimation device 3 according to the present embodiment is configured to acquire a bokeh value indicating bokeh occurring in a subject in an image and uncertainty of the bokeh value from the time-series images captured by the capture device 2 (monocular camera) by using the statistical model, and estimate a position and orientation of a mobile object based on a real scale by using a useful distance extracted based on a distance converted from the bokeh value and the uncertainty of the bokeh value and uncertainty of the distance.

Note that in FIG. 1, it has been described that the estimation system 1 includes the capture device 2 and the estimation device 3, which are separate devices, but the capture device 2 and the estimation device 3 may be configured as an integrated device. Further, the estimation system 1 according to the present embodiment may be realized as an embedded system built in various electronic apparatuses.

FIG. 2 is a diagram illustrating an exemplary configuration of hardware of the capture device 2. As illustrated in FIG. 2, the capture device 2 includes a lens 201, an image sensor 202, a nonvolatile memory 203, and a communication device 204. Note that the lens 201 and the image sensor 202 correspond to an optical system of the capture device 2 (monocular camera).

Light reflected on the subject enters the lens 201. The light having entered the lens 201 passes through the lens 201. The light having passed through the lens 201 reaches the image sensor 202, so that the image sensor 202 receives (detects) the light. The image sensor 202 converts (photoelectrically converts) the received light into an electric signal to generate an image of a plurality of pixels.

Note that for example, the image sensor 202 is achieved by a charge coupled device (CCD) image sensor or a complementary metal oxide semiconductor (CMOS) image sensor. For example, the image sensor 202 includes a first sensor (R sensor) that detects light in a red (R) wavelength band, a second sensor (G sensor) that detects light in a green (G) wavelength band, and a third sensor (B sensor) that detects light in a blue (B) wavelength band. The image sensor 202 can receive light in the wavelength bands corresponding to the first to third sensors, and generate sensor images (R image, G image, and B image) corresponding to the respective wavelength bands (color components). That is, the image captured by the capture device 2 is a color image (RGB image), and the image includes the R image, the G image, and the B image.

Note that the image sensor 202 including the first to third sensors will be described in the present embodiment. However, the image sensor 202 may only need to include at least one of the first to third sensors. Further, the image sensor 202 may include a sensor for generation of a monochrome image, instead of including the first to third sensors.

In the present embodiment, the image generated based on the light having passed through the lens 201 (image captured by the capture device 2) is the image that has been affected by the aberration of (lens 201 included in) the optical system, and thus, includes bokeh that occurs due to the aberration. Note that the bokeh that occurs in the image will be described in detail below.

Although not illustrated in FIG. 2, (the optical system of) the capture device 2 further includes, for example, a focus adjustment mechanism (lens drive circuit) for controlling a focal point by adjusting a position of the lens 201, a diaphragm mechanism (diaphragm control circuit) having an aperture for adjusting a quantity of light (quantity of incident light) taken into the optical system of the capture device 2, and the like.

The nonvolatile memory 203 is a storage medium for storing an image or the like captured by the capture device 2 described above.

The communication device 204 is a device configured to perform wired communication or wireless communication. The communication device 204 executes communication or the like with an external device via a network. The external device includes the estimation device 3. In this case, the capture device 2 transmits an image captured by the capture device 2 to the estimation device 3 via the communication device 204.

FIG. 3 is a diagram illustrating an exemplary configuration of hardware of the estimation device 3. As illustrated in FIG. 3, the estimation device 3 includes a CPU 301, a nonvolatile memory 302, a RAM 303, and a communication device 304.

The CPU 301 is a processor configured to control operations of various components in the estimation device 3. The CPU 301 may be a single processor or may be formed of a plurality of processors. The CPU 301 executes various programs loaded from the nonvolatile memory 302 to the RAM 303. Examples of the programs include an operating system (OS) and various application programs. The application program includes an estimation program for estimating the position and orientation of the mobile object described above.

The nonvolatile memory 302 is a storage medium for use as an auxiliary storage. The RAM 303 is a storage medium for use as a main storage. Although only the nonvolatile memory 302 and the RAM 303 are illustrated in FIG. 3, the estimation device 3 may include a different storage, such as a hard disk drive (HDD) and a solid state drive (SSD).

Note that in the present embodiment, some or all of the image acquisition module 31, the distance acquisition module 32, the extraction module 33, and the estimation module 34 which are illustrated in FIG. 1 are implemented by causing the CPU 301 (that is, the computer of the estimation device 3) to execute the estimation program, that is, by software. The estimation program may be distributed in the state of being stored in a computer-readable storage medium, or may be downloaded to the estimation device 3 through a network. Note that some or all of these modules 31 to 34 may be implemented by hardware such as an integrated circuit (IC), or may be implemented by a combination of the software and the hardware.

The communication device 304 is a device configured to execute wired communication or wireless communication. The communication device 304 executes communication or the like with an external device via a network. The external device includes the capture device 2. In this case, the estimation device 3 receives an image captured by the capture device 2 from the capture device 2 via the communication device 304.

Here, in the present embodiment, the position and orientation of the mobile object is estimated by using the bokeh value output from the statistical model to which the image is input and the uncertainty of the bokeh value (distance converted from the bokeh value and the uncertainty of the bokeh value and the uncertainty of the distance) as described above, and the statistical model will be described below.

Figure 4:
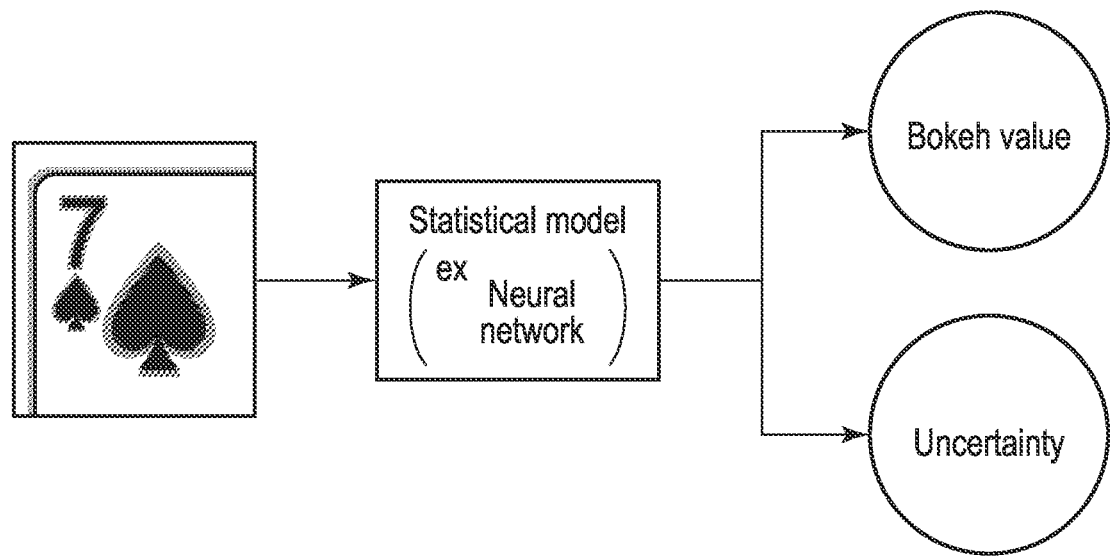
FIG. 4 is a diagram for describing an outline of a statistical model.

First, an outline of the statistical model described above will be described with reference to FIG. 4. In the present embodiment, the image affected by the aberration of the optical system (lens 201) described above is generated by the capture device 2 (image sensor 202), and the image is input into the statistical model.

According to the statistical model in the present embodiment, the bokeh value (bokeh information) indicating the bokeh occurring in the image is estimated in accordance with the distance to the subject included in the input image as described above, and the bokeh value is output.

According to the statistical model in the present embodiment, the uncertainty of the bokeh value indicating the bokeh occurring in the image is calculated as described above, and the uncertainty of the bokeh value is output. In this case, for example, the statistical model performs learning so as to calculate uncertainty of a prediction value (bokeh value) by using Bayesian inference. Further, the statistical model may perform learning so as to calculate the uncertainty of the bokeh value by using variance (variation error of the prediction value). The uncertainty of the bokeh value calculated by the statistical model in the present embodiment is represented by, for example, a real number of zero or more, and indicates that the uncertainty of the bokeh value is higher as the value is larger. Note that a method of calculating the uncertainty of the bokeh value is not limited to a specific method, and various known methods can be applied.

Here, in the present embodiment, bokeh due to the aberration of the optical system (lens aberration) of the capture device 2 as described above occurs in the image captured by the capture device 2. The bokeh that occurs in the image captured by the capture device 2 will be described below. First, chromatic aberration related to the bokeh, which occurs due to the aberration of the optical system of the capture device 2, will be described.

FIG. 5 illustrates the relationship between the distance to the subject and the bokeh that occurs in the image due to the chromatic aberration. In the following description, an in-focus position in the capture device 2 is referred to as a focal point.

A refractive index of the lens 201 having aberration varies for every wavelength band of light passing therethrough. Thus, for example, in a case where the position of the subject is shifted from the focal point, the rays of light in the respective wavelength bands do not converge to one point and reach different points. As a result, the chromatic aberration (bokeh) appears on the image.

FIG. 5 illustrates, on the upper side thereof, a case where the position of the subject is far from the capture device 2 (image sensor 202) with respect to the focal point (that is, the position of the subject is on the far side of the focal point).

In this case, regarding light 401 in the red wavelength band, the image sensor 202 (first sensor) generates an image including relatively small bokeh $b_R$. Meanwhile, regarding light 402 in the blue wavelength band, the image sensor (third sensor) generates an image including relatively large bokeh $b_B$. Note that regarding the light 403 in the green wavelength band, an image including bokeh intermediate in size between the bokeh $b_R$ and the bokeh $b_B$ is generated. Therefore, in the image captured with the position of the subject far with respect to the focal point, blue bokeh is observed on an outer side of the subject in the image.

Meanwhile, FIG. 5 illustrates, on the lower side thereof, a case where the position of the subject is near to the capture device 2 (image sensor 202) with respect to the focal point (that is, the position of the subject is on the near side of the focal point).

In this case, regarding the light 401 in the red wavelength band, the image sensor 202 (first sensor) generates an image including relatively large bokeh $b_R$. Meanwhile, regarding the light 402 in the blue wavelength band, the image sensor 202 (third sensor) generates an image including relatively small bokeh $b_B$. Note that regarding the light 403 in the green wavelength band, an image including bokeh intermediate in size between the bokeh $b_R$ and the bokeh $b_B$ is generated. Therefore, in the image captured with the position of the subject near with respect to the focal point, a red bokeh is observed on an outer side of the subject in the image.

Here, FIG. 5 illustrates the example in which the lens 201 is the simple single lens. However, for example, a lens subjected to chromatic aberration correction (hereinafter, referred to as an achromatic lens) is used in the capture device 2 in general. Note that the achromatic lens is a combination of a low-dispersion convex lens and a high-dispersion concave lens and is smallest in the number of lenses among lenses for correction of chromatic aberration.

FIG. 6 illustrates the relationship between the distance to the subject and the bokeh that occurs in the image due to the chromatic aberration in a case where the achromatic lens is used as the lens 201. Although the achromatic lens is designed to have the focal point constant between blue wavelength and red wavelength, the chromatic aberration cannot be eliminated completely. Therefore, in a case where the position of the subject is far with respect to the focal point, green bokeh occurs as illustrated on the upper side of FIG. 6. In a case where the position of the subject is near with respect to the focal point, purple bokeh occurs as illustrated on the lower side of FIG. 6.

Note that FIGS. 5 and 6 each illustrate, on the middle side thereof, a case where the position of the subject to the capture device 2 (image sensor 202) coincides with the focal point. In this case, the image sensor 202 (first to third sensors) generates an image having bokeh less in amount.

Here, since the diaphragm mechanism is provided in the optical system of the capture device 2 as described above, the shape of the bokeh that occurs in the image captured by the capture device 2 varies due to the size of the aperture of the diaphragm mechanism. Note that the shape of the bokeh is referred to as a point spread function (PSF) shape, and indicates the diffusion distribution of light that occurs at the time of capturing of a point light source.

Figure 7:
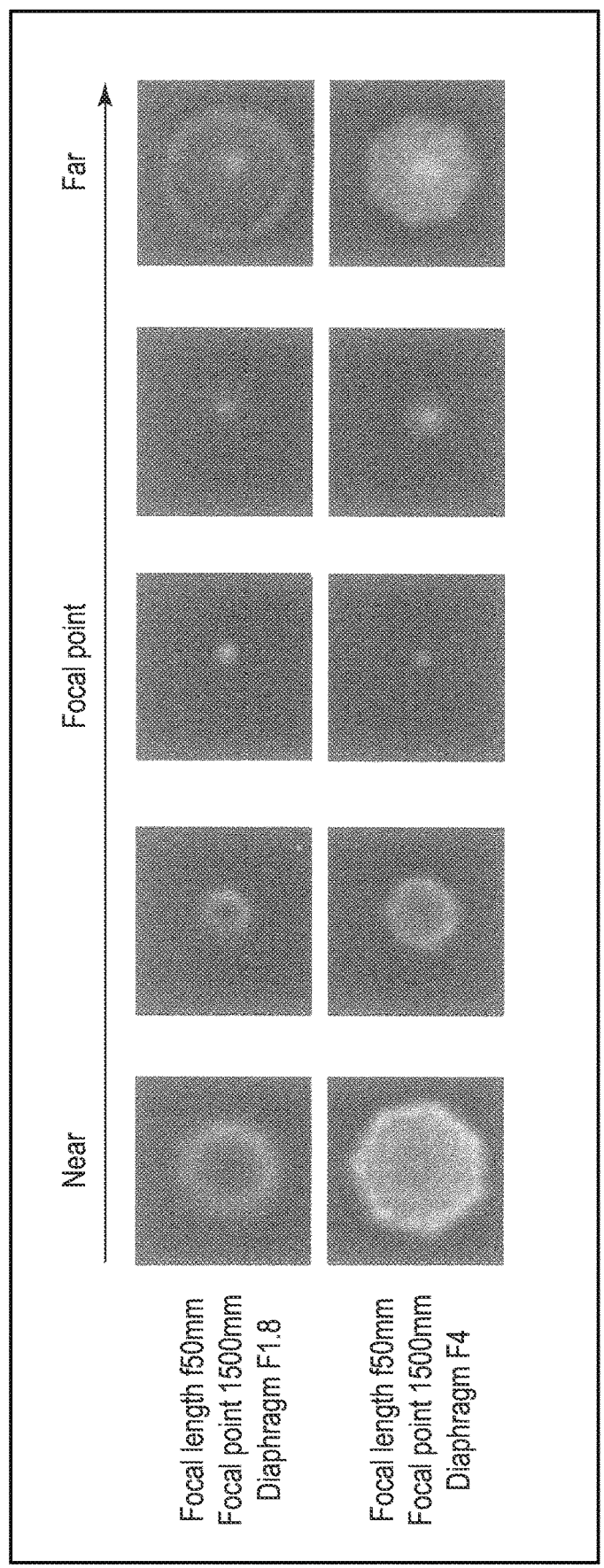
FIG. 7 is a diagram illustrating a relationship between a size of an aperture of a diaphragm mechanism included in an optical system of a capture device and a PSF shape.

FIG. 7 illustrates, from left on the upper side thereof, the PSF shape that occurs in the central portion of the image captured by the capture device 2 including a lens having a focal length of 50 mm with the focal point and the f-number (aperture) that are 1500 mm and F1.8, respectively, in (the optical system of) the capture device 2, in order of the position of the subject closer to the capture device 2. FIG. 7 illustrates, from left on the lower side thereof, the PSF shape that occurs in the central portion of the image captured by the capture device 2 including a lens having a focal length of 50 mm with the focal point and the f-number (aperture) that are 1500 mm and F4, respectively, in (the optical system of) the capture device 2, in order of the position of the subject closer to the capture device 2. Note that FIG. 7 illustrates, at the center on each of the upper side and the lower side thereof, the PSF shape in a case where the position of the subject coincides with the focal point.

The respective PSF shapes illustrated at the corresponding positions on the upper side and the lower side of FIG. 7 are identical in the position of the subject to the capture device 2. However, even in a case where identification is satisfied in the position of the subject, the PSF shape on the upper side (PSF shape that occurs in the image captured with the f-number being F1.8) and the PSF shape on the lower side (PSF shape that occurs in the image captured with the f-number being F4) are different in shape.

Further, as indicated in the PSF shape on the leftmost side of FIG. 7 and the PSF shape on the rightmost side of FIG. 7, the PSF shapes in a case where the position of the subject is closer than the focal point are different from those in a case where the position of the subject is farther than the focal point even in a case where, for example, the distance from the position of the subject to the focal point is approximately the same.

Figure 8:
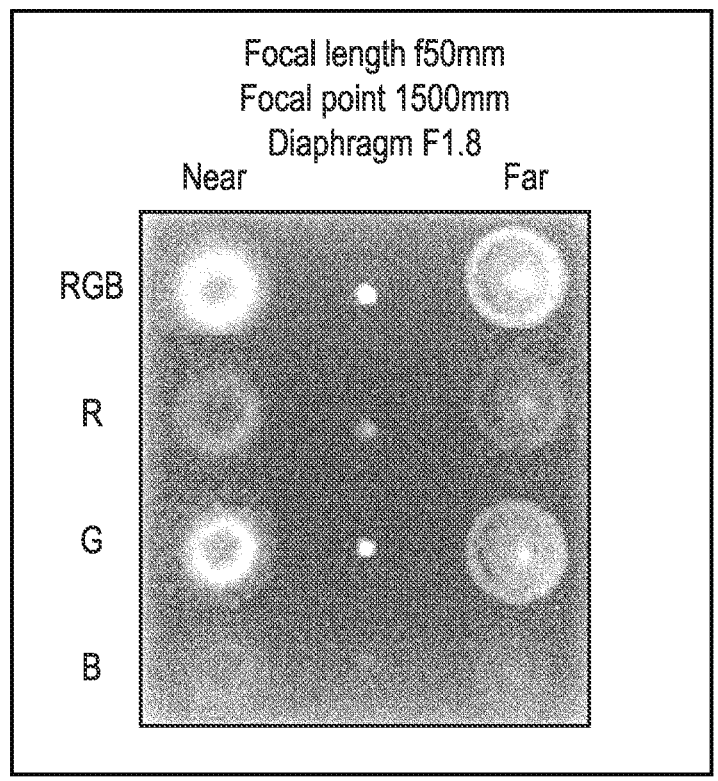
FIG. 8 is a diagram illustrating an exemplary PSF shape that occurs in an image on each channel.
Figure 9:
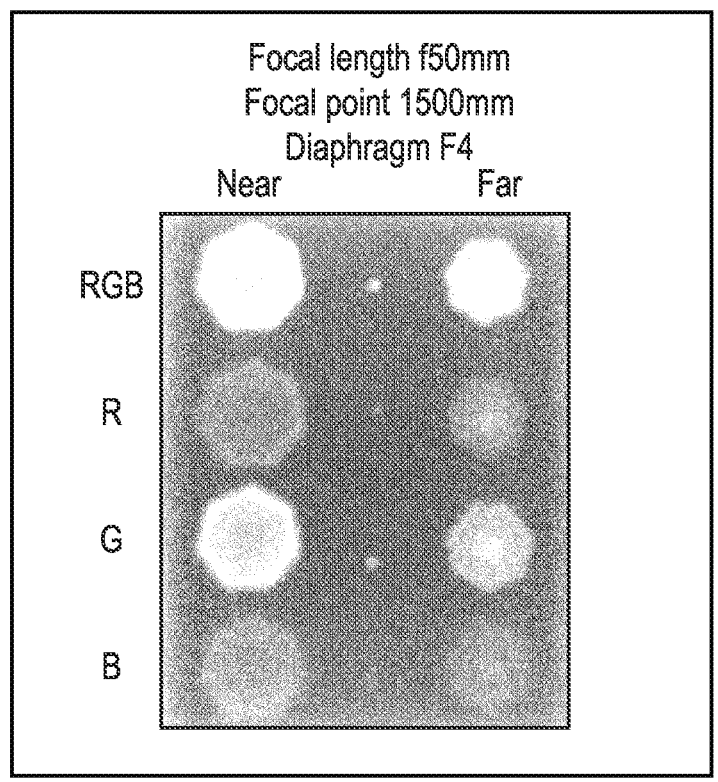
FIG. 9 is a diagram illustrating another exemplary PSF shape that occurs in an image on each channel.

Note that the phenomenon, in which the PSF shape varies in accordance with the size of the aperture of the diaphragm mechanism or the position of the subject to the capture device 2 as described above, occurs in each channel (RGB image, R image, G image, and B image), similarly. FIG. 8 separately illustrates a case where the position of the subject is near with respect to the focal point (near side) and a case where the position of the subject is far with respect to the focal point (far side), for the PSF shape that occurs in the image in each channel captured by the capture device 2. In FIG. 8, the capture device 2 includes a lens having a focal length of 50 mm with the focal point and the f-number that are 1500 mm and F1.8, respectively. FIG. 9 separately illustrates a case where the position of the subject is near with respect to the focal point and a case where the position of the subject is far with respect to the focal point, for the PSF shape that occurs in the image in each channel captured by the capture device 2. In FIG. 9, the capture device 2 includes a lens having a focal length of 50 mm with the focal point and the f-number that are 1500 mm and F4, respectively.

As described above, the statistical model used in the present embodiment is generated by learning the bokeh that varies non-linearly in accordance with the distance to the subject included in the image. However, examples of the bokeh that varies non-linearly include the bokeh that occurs due to the chromatic aberration of the optical system of the capture device 2 described in FIGS. 5 and 6, and the bokeh that occurs in accordance with the size of the aperture (that is, the f-number) of the diaphragm mechanism that adjusts the quantity of light to be taken in the optical system of the capture device 2 described in FIGS. 7 to 9.

Figure 10:
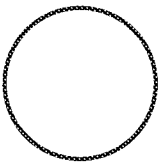
FIG. 10 is a diagram illustrating a relationship between nonlinearity of a PSF shape and a shape of an aperture of a diaphragm mechanism.

Note that the PSF shape varies depending on the shape of the aperture of the diaphragm mechanism. Here, FIG. 10 illustrates the relationship between the nonlinearity (asymmetry) of the PSF shape and the shape of the aperture of the diaphragm mechanism. The nonlinearity of the PSF shape described above occurs easily in a case where the shape of the aperture of the diaphragm mechanism is not circular. In particular, the nonlinearity of the PSF shape occurs easily in a case where the shape of the aperture is odd-gonal or in a case where an even-gon is arranged asymmetrically to the horizontal or vertical axis of the image sensor 202.

Note that although detailed description is omitted here, the PSF shape further has position dependency. That is, examples of the bokeh that varies non-linearly in the present embodiment may include bokeh that varies in accordance with the position in the image captured by the capture device 2.

In the estimation device 3 (estimation system 1) according to the present embodiment, the bokeh value indicating the bokeh occurring in the image is estimated (predicted) using the statistical model generated by focusing on a point where (a color, a size, and a shape of) the bokeh occurring in the image is a physical clue regarding the distance to the subject. Note that the bokeh value estimated by the statistical model (that is, output from the statistical model) in the present embodiment is a scalar quantity representing a bokeh quantity including the color, size, and shape of the bokeh occurring in the image.

Hereinafter, an exemplary method of estimating (the bokeh value indicating) the bokeh from the image by the statistical model in the present embodiment will be described. Here, the first, second, and third methods will be described.

First, the first method will be described with reference to FIG. 11. In the first method, a local region (image patch) 501a is extracted from an image 501.

In this case, for example, the entire region of the image 501 may be divided in a matrix and then each divided partial region may be sequentially extracted as the local region 501a. The local region 501a may be extracted by recognition of the image 501 such that the region in which the subject (image) is detected is covered. Further, the local region 501a may partially overlap another local region 501a.

Next, information regarding the local region 501a (information on the image 501) is input into the statistical model for each of the extracted local regions 501a, whereby a bokeh value indicating bokeh that occurs in accordance with a distance to a subject in the local region 501a is estimated.

The statistical model in which the information regarding the local region 501a is input as above, estimates a bokeh value 502 for every pixel of the local region 501a.

Here, for example, in a case where a specific pixel belongs to both of a first local region 501a and a second local region 501a (that is, the pixel is included in the region in which the first local region 501a and the second local region 501a overlap), a bokeh value estimated with the pixel belonging to the first local region 501a and a bokeh value estimated with the pixel belonging to the second local region 501a do not necessarily coincide with each other.

Thus, for example, as described above, in a case where a plurality of local regions 501a partially overlapping has been extracted, the bokeh value based on a pixel in the region in which the local regions 501a overlap may be an average value of, for example, the bokeh value estimated based on the overlapped partial region (pixel) of one local region 501a and the bokeh value estimated based on the overlapped partial region (pixel) of the other local region 501a. Further, a determination may be made by majority decision based on the bokeh value estimated for each partial region of three or more local regions 501a partially overlapping.

FIG. 12 illustrates exemplary information regarding the local region 501a to be input into the statistical model in the first method described above.

As illustrated in FIG. 12, gradient data of the local region 501a extracted from the image 501 is input into the statistical model. The gradient data of the local region 501a is generated from each of an R image, a G image, and a B image included in the image 501, and includes gradient data of the R image, gradient data of the G image, and gradient data of the B image.

Note that the gradient data indicates a difference in a pixel value (difference value) between each pixel and a pixel adjacent thereto. For example, in a case where the local region 501a is extracted as a rectangular region of n pixels (X-axis direction)×m pixels (Y-axis direction), the gradient data is generated in which the difference value calculated between each pixel in the local region 501a and, for example, the right adjacent pixel thereto is arranged in a matrix of n rows×m columns.

With the gradient data of the R image, the gradient data of the G image, and the gradient data of the B image, the statistical model estimates a bokeh value indicating bokeh occurring in each image. FIG. 12 illustrates a case where the gradient data of each of the R image, the G image, and the B image is input into the statistical model. However, the gradient data of the image 501 (RGB image) may be input into the statistical model.

Figure 13:
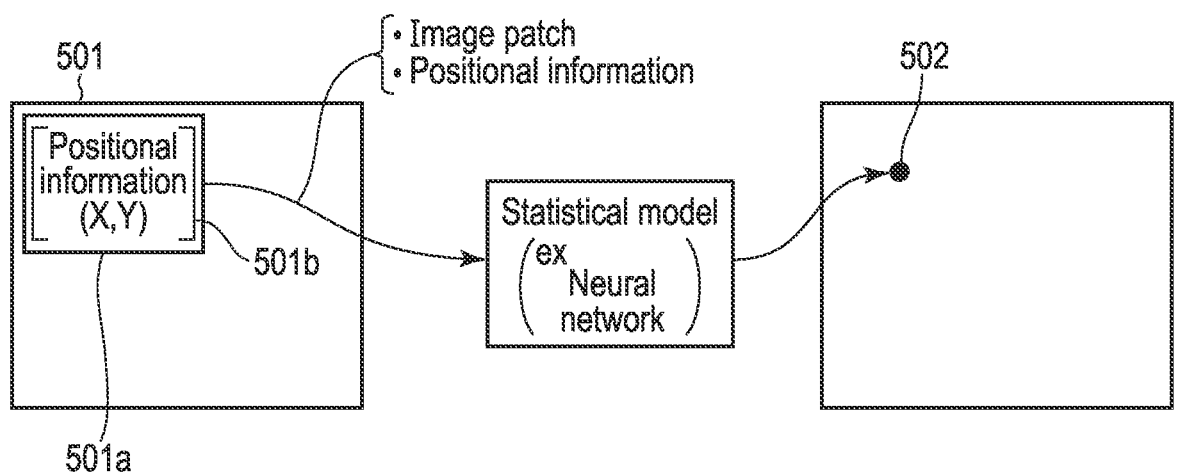
FIG. 13 is a diagram for describing a second method of estimating bokeh from an image.

Next, the second method will be described with reference to FIG. 13. In the second method, as the information regarding the local region 501a in the first method, the gradient data of each local region (image patch) 501a and positional information regarding the local region 501a in the image 501 are input into the statistical model.

For example, positional information 501b may indicate a central point of the local region 501a or may indicate a predetermined side such as an upper-left side. Further, as the positional information 501b, positional information on the image 501 regarding each pixel of the local region 501a may be used.

Additional input of the positional information 501b into the statistical model as described above enables estimation of the bokeh value 502 in consideration of the difference between the bokeh of a subject image formed by light passing through the central portion of the lens 201 and the bokeh of a subject image formed by light passing through an end portion of the lens 201.

That is, the bokeh value can be estimated from the image 501 based on the correlation with the position on the image according to the second method.

FIG. 14 illustrates exemplary information regarding the local region 501a to be input into the statistical model in the second method described above.

For example, in a case where a rectangular region of n pixels (X-axis direction)×m pixels (Y-axis direction) is extracted as the local region 501a, an X-coordinate value (X-coordinate data) on the image 501 corresponding to, for example, the central point of the local region 501a and a Y-coordinate value (Y-coordinate data) on the image 501 corresponding to, for example, the central point of the local region 501a are acquired.

In the second method, the X-coordinate data and the Y-coordinate data acquired in this manner are input into the statistical model, together with the pieces of gradient data of the R image, the G image, and the B image.

Further, the third method will be described with reference to FIG. 15. In the third method, no local region 501a is extracted from the image 501, unlike the first method and the second method. In the third method, information regarding the entire region of the image 501 (pieces of gradient data of the R image, the G image, and the B image) are input into the statistical model.

In comparison with the first method and the second method in which the bokeh value 502 is estimated for every local region 501a, the third method is likely to increase the uncertainty of estimation of the statistical model but enables reduction of the load of processing related to the estimation.

In the following description, for convenience, the information to be input into the statistical model in each of the first, second, and third methods is referred to as information regarding the image.

Although it has been described herein that the bokeh value is estimated for each pixel, the bokeh value may be estimated for each predetermined region including at least one pixel.

Further, in a case where the bokeh value is estimated for each pixel in the statistical model (that is, the bokeh value is output for each pixel) as described above, the statistical model similarly calculates (outputs) the uncertainty for each pixel.

Hereinafter, the correlation between the bokeh occurring in the image and the distance to the subject included in the image in the present embodiment will be specifically described with reference to FIG. 16.

Figure 16:
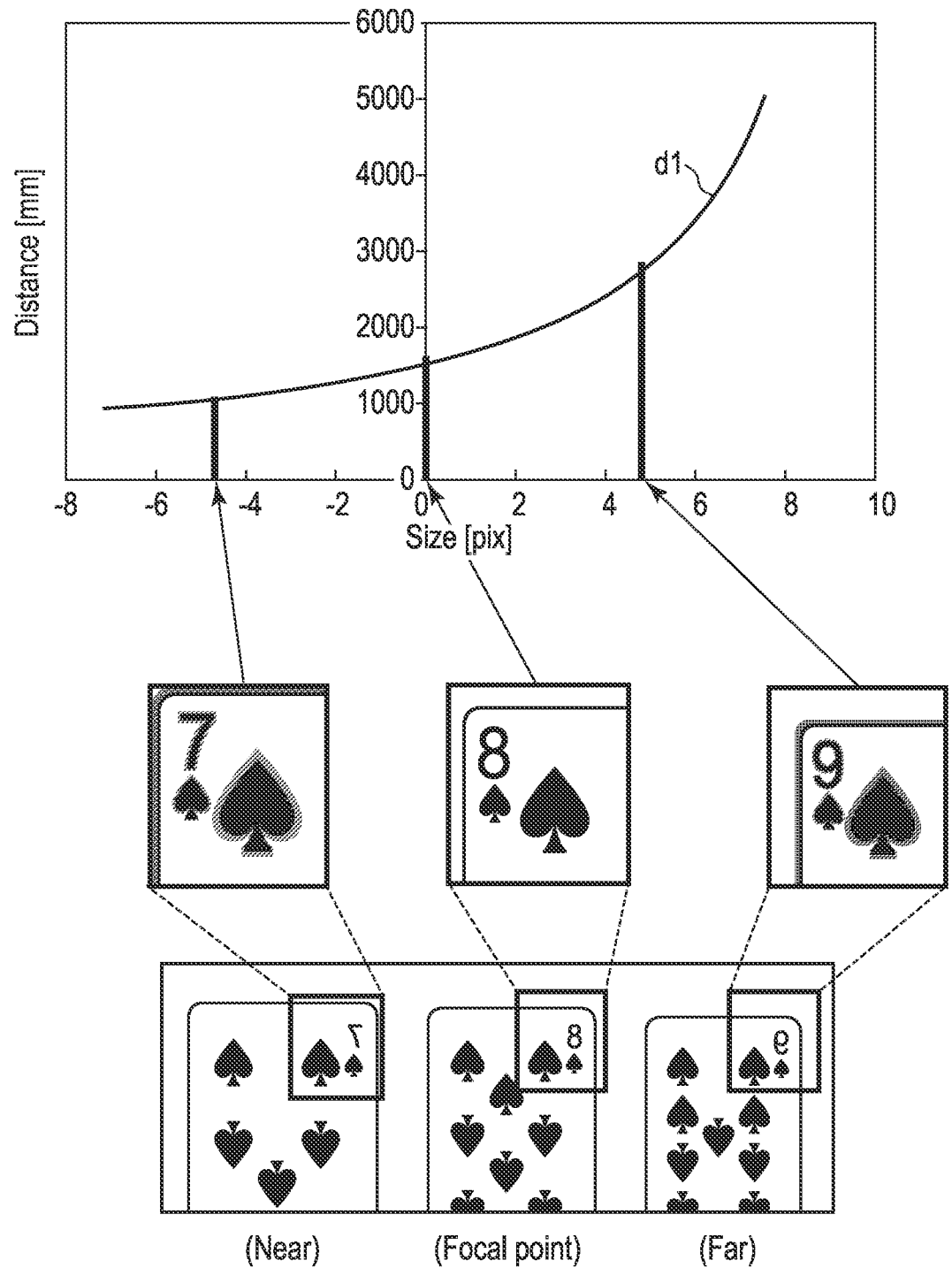
FIG. 16 is a diagram for specifically describing a correlation between bokeh occurring in an image and a distance to a subject in the image.

In FIG. 16, the size of the bokeh that occurs in a case where the subject is near with respect to the focal point (near side) is indicated negatively in value on the X axis. Further, in FIG. 16, the size of the bokeh that occurs in a case where the subject is far with respect to the focal point (far side) is indicated positively in value on the X axis. That is, in FIG. 16, the color and size of the bokeh are indicated positively and negatively in value.

FIG. 16 illustrates that an absolute value of the size (pixel) of the bokeh increases as the subject moves away from the focal point in both of the case where the position of the subject is near with respect to the focal point and the case where the position of the subject is far with respect to the focal point.

The example illustrated in FIG. 16 assumes that the focal point is approximately 1500 mm in the optical system in which the image is captured. In this case, for example, the bokeh that is approximately −4.8 pixels in size corresponds to a distance of approximately 1000 mm from the optical system (that is, capture device 2). The bokeh that is 0 pixels in size corresponds to a distance of 1500 mm from the optical system. The bokeh that is approximately 4.8 pixels in size corresponds to a distance of approximately 750 mm from the optical system.

Here, for convenience, the case where the size (pixel) of the bokeh is indicated on the X axis has been described. As described in FIGS. 7 to 9, the shape of the bokeh (PSF shape) that occurs in the image varies between the case where the subject is near with respect to the focal point and the case where the subject is far with respect to the focal point. Therefore, the value (that is, bokeh value) indicated on the X axis in FIG. 16 has in practice taken the shape of the bokeh (PSF shape) into account.

The above-described distance to the subject is in correlation with the color, size, and shape of the bokeh as indicated with a line segment d1 of FIG. 16 (relationship having one to one correspondence), for example, and thus, estimation of the distance and estimation of (bokeh values indicating) the color, size, and shape of the bokeh are synonymous.

Note that, for example, a configuration in which the statistical model directly estimates a distance can be considered, but it can be said that the configuration in which the statistical model estimates the bokeh value can use the same statistical model even in a case where the focal point in the optical system is changed and has high versatility.

Here, the statistical model described above is generated by executing processing (learning process) of learning the bokeh that occurs in the subject in the image (bokeh that varies non-linearly in accordance with the distance to the subject). Hereinafter, the learning process for generating the statistical model (hereinafter, simply referred to as the learning process of the statistical model) will be briefly described.

First, an exemplary learning process of the statistical model will be described with reference to FIG. 17. Here, the learning process of the statistical model with the image captured by the capture device 2 will be described. However, for example, the learning process of the statistical model may be carried out with an image captured by a different device (e.g., a camera) having an optical system similar to the optical system of the capture device 2. In the following description, the image used for the learning process of the statistical model is referred to as an image for learning for convenience.

In a case where any one of methods is used from the first method described with reference to FIG. 11, the second method described with reference to FIG. 13, and the third method described with reference to FIG. 15, the learning process of the statistical model is carried out basically by inputting information regarding an image for learning into the statistical model and feeding an error between a bokeh value estimated by the statistical model and a correct value back to the statistical model. Note that the feedback refers to updating a parameter (for example, weighting factor) of the statistical model so as to reduce the error.

In a case where the first method is applied as the method of estimating the bokeh value from the above-described image, the information regarding the local region (gradient data) is input into the statistical model for every local region (image patch) extracted from the image for learning even during the learning process of the statistical model. Accordingly, the bokeh value is estimated based on each pixel in each local region by the statistical model. The error acquired by comparison between the bokeh value estimated in this manner and the correct value, is fed back to the statistical model.

Similarly, in a case where the second method is applied as the method of estimating the bokeh value from the image, gradient data as the information regarding the local region and positional information are input into the statistical model for every local region (image patch) extracted from the image for learning even during the learning process of the statistical model. Accordingly, the bokeh value is estimated based on each pixel in each local region by the statistical model. The error acquired by comparison between the bokeh value estimated in this manner and the correct value, is fed back to the statistical model.

In a case where the third method is applied as the method of estimating the distance from the image, the information regarding the entire region of the image for learning (gradient data) is collectively input into the statistical model even during the learning process of the statistical model. Accordingly, the bokeh value is estimated based on each pixel in the image for learning by the statistical model. The error acquired by comparison between the bokeh value estimated in this manner and the correct value, is fed back to the statistical model.

Note that, in a case where the information regarding the image for learning is input into the statistical model as described above, the uncertainty of the bokeh value is calculated similarly to the case described above with reference to FIG. 4. An error obtained by dividing the error between the bokeh value and the correct value by the square of the uncertainty is fed back in the learning process of the statistical model in this case. In this case, the error becomes zero when the uncertainty is set to infinity, and thus, the square of the uncertainty is added to the error as a penalty.

According to the learning process of the statistical model described above, the parameter (for example, weighting factor) of the statistical model is updated such that the error corrected with the uncertainty decreases.

Here, for example, in a case where there is no error between the bokeh value estimated by the statistical model and the correct value but the uncertainty is high, it can be estimated that there is a possibility that the bokeh value has been estimated by chance. In this case, it is possible to recognize that the learning of the bokeh value (correct value) is insufficient.

In a case where the uncertainty calculated by the statistical model is used in this manner, it is also possible to reduce a learning bias.

Note that, for example, the statistical model in the present embodiment is generated by repeatedly carrying out the learning process with the image for learning captured while the distance from the capture device 2 to the subject is varied with the focal point fixed (that is, the image for learning in which the distance to the subject is known). Further, in a case where the learning process has been completed for one focal point, the learning process is carried out similarly for another focal point, so that a higher-accuracy statistical model can be generated.

Note that the correct value used at the time of learning of the statistical model in the present embodiment is a bokeh value converted from an actual distance to the subject (that is, bokeh value indicating a color, a size, and a shape of bokeh corresponding to the actual distance) when the image for learning is captured as described above.

Next, an exemplary processing procedure of the learning process of the statistical model will be described with reference to a flowchart of FIG. 18. Note that, for example, the processing illustrated in FIG. 18 may be executed in the estimation device 3 or may be executed in a different device.

First, the information regarding an image for learning prepared in advance is input into the statistical model (Step S1). For example, the image for learning is an image generated by the image sensor 202, based on the light having passed through the lens 201 included in the capture device 2, the image being affected by the aberration of the optical system (lens 201) of the capture device 2. Specifically, the image for learning includes the bokeh that varies non-linearly in accordance with the distance to the subject described above.

Note that the image for learning, obtained by capturing the subject at each distance with as fine granularity as possible from a lower limit value (near side) to an upper limit value (far side) of the distance that can be acquired (estimated) by the estimation device 3, is prepared in advance in the learning process of the statistical model. Further, as the image for learning, it is preferable to prepare various images having different subjects.

Note that, in a case where the first method described above is applied as the method of estimating the bokeh value from the image, as the information regarding the image for learning, for every local region of the image for learning, the pieces of gradient data of the R image, the G image, and the B image are input into the statistical model.

In a case where the second method is applied as the method of estimating the bokeh value from the image, as the information regarding the image for learning, for every local region of the image for learning, the pieces of gradient data of the R image, the G image, and the B image together with the positional information regarding the local region on the image for learning are input into the statistical model.

In a case where the third method is applied as the method of estimating the bokeh value from the image, as the information regarding the image for learning, the pieces of gradient data of the R image, the G image, and the B image for the entire region of the image for learning are input into the statistical model.

Note that, in the present embodiment, the description in which the pieces of gradient data of the R image, the G image, and the B image are input into the statistical model, is given. However, in a case where the bokeh value is estimated from the viewpoint of the shape of the bokeh (PSF shape) that occurs in the image, at least one piece of gradient data of the pieces of gradient data of the R image, the G image, and the B image only needs to be input into the statistical model. Meanwhile, in a case where the bokeh value is estimated from the viewpoint of the color and size of the bokeh that occurs in the captured image due to the chromatic aberration, at least two pieces of gradient data of the pieces of gradient data of the R image, the G image, and the B image may need to be input into the statistical model.

When the information regarding the image for learning is input into the statistical model, the bokeh value is estimated by the statistical model (Step S2).

Further, when the processing in Step S2 is executed, the statistical model calculates an uncertainty for the bokeh value estimated in Step S2 (Step S3).

The bokeh value estimated in Step S2 is compared with the correct value acquired at the time of capturing of the image for learning (Step S4).

The comparison result (error) in Step S4 is corrected using the uncertainty calculated in Step S3 and fed back to the statistical model (Step S5). Thus, a parameter in the statistical model is updated such that the error is reduced (that is, learning of the bokeh occurring in the image for learning is carried out in accordance with the distance to the subject).

As the processing illustrated in FIG. 18 is repeatedly executed for each image for learning, the statistical model with high estimation accuracy is generated. The statistical model generated in this manner is held in the estimation device 3 (distance acquisition module 32).

Next, an exemplary processing procedure of the estimation device 3 when the position and orientation of the mobile object is estimated will be described with reference to a flowchart of FIG. 19.

In the present embodiment, the capture device 2 installed in the mobile object continuously captures a plurality of images while the mobile object moves, and the image acquisition module 31 included in the estimation device 3 acquires a plurality of images continuously captured by the capture device 2 as the time-series images.

The image acquisition module 31 acquires the first image included in the time-series images acquired as described above (Step S11). The first image acquired in Step S11 is, for example, an image captured by the capture device 2 (for example, an image or the like captured first when the mobile object starts moving) from a position serving as a starting point in a three-dimensional space in which the mobile object moves.

Note that the first image is, for example, a color image including the R image, the G image, and the B image (that is, including three channels of RGB), but may be a Bayer array image or the like. Further, the first image may be a monochrome image (image of one channel of gray scale).

When the processing in Step S11 is executed, the estimation module 34 detects a plurality of feature points (feature point group) from the first image acquired in Step S11 (Step S12). The feature points detected in Step S12 include an edge, a corner, and the like (of the subject) on the first image detected based on a local feature amount (for example, a luminance difference or the like) in the first image. As the feature amount for detecting the feature points, for example, an ORB or the like can be used. Hereinafter, each of the feature points detected from the first image in Step S12 is referred to as a feature point of the first image for convenience.

Next, the distance acquisition module 32 acquires a distance to the subject included in the first image and the uncertainty of the distance by using the statistical model held in the distance acquisition module 32 (Step S13).

In Step S13, processing corresponding to the processing in Steps S1 to S3 illustrated in FIG. 18 are executed. That is, in Step S13, the distance acquisition module 32 acquires the bokeh value output from the statistical model and the uncertainty of the bokeh value by inputting information regarding the first image into the statistical model.

Note that, in a case where the information regarding the first image is input into the statistical model, the bokeh value and the uncertainty of the bokeh value are output for each pixel configuring the first image. However, in Step S13, the bokeh value output from the statistical model and the uncertainty of the bokeh value (hereinafter, it is referred to as a bokeh value and uncertainty of the feature point) may only need to be acquired for the pixel (feature point pixel) corresponding to the feature point based on the coordinate of each feature point of the first image (X coordinate and a Y coordinate on the first image).

Further, it has been described herein that the statistical model outputs the bokeh value and the uncertainty of the bokeh value for each pixel configuring the first image, but the statistical model may be configured to output, for example, a bokeh value image in which the bokeh value estimated for each pixel is assigned as the pixel value of the pixel and an uncertainty image in which the uncertainty of the bokeh value calculated for each pixel is assigned as the pixel value of the pixel. Even in such a case, the distance acquisition module 32 can acquire the pixel value of the feature point pixel on the bokeh value image and the uncertainty image as the bokeh value and the uncertainty of the feature point.

Here, as described in FIG. 16, the bokeh value corresponds to the distance to the subject in which the bokeh indicated by the bokeh value occurs on a one-to-one basis. Therefore, the distance acquisition module 32 converts the bokeh value and the uncertainty of the bokeh value, acquired in Step S13, into a distance corresponding to the bokeh value and uncertainty of the distance (Step S14).

First, processing of converting the bokeh value into a distance corresponding to the bokeh value will be described in Step S14. FIG. 20 illustrates the relationship between the bokeh value and the distance based on the perspective projection model, but the relationship between the bokeh value and the distance to the subject can be expressed by Equation (1) below.

$$\frac{1}{u} = -\frac{2p}{av}b + \frac{1}{f} - \frac{1}{v} \qquad \text{Equation (1)}$$

That is, according to Equation (1), a bokeh value b can be converted into a distance u to the subject by using a pixel pitch p, an aperture diameter a of the diaphragm mechanism (aperture diameter of the lens 201) based on a diaphragm value F, a distance v between the lens 201 and the image sensor 202, and a focal length f of the lens 201.

Note that, as described above, the distance (distance to the subject) converted from the bokeh value is with a unit of length used in a real space, and is based on the real scale.

Next, processing of converting the uncertainty of the bokeh value into uncertainty of a distance corresponding to the bokeh value will be described in Step S14. FIG. 21 illustrates the relationship between the bokeh value indicating the color, size, and shape of the bokeh described above and the distance corresponding to the bokeh value, and the relationship between the distance and the uncertainty of the distance.

Here, in FIG. 21, it is assumed that the uncertainty of the bokeh value is fixed. That is, FIG. 21 illustrates that the uncertainty of the distance corresponding to the uncertainty of the bokeh value varies in accordance with the distance although the uncertainty of the bokeh value is constant.

Specifically, since the relationship between the bokeh value and the distance is nonlinear, the relationship between the uncertainty of the bokeh value and the uncertainty of the distance is also nonlinear, but the uncertainty of the distance has dependency on the square of the distance (relationship proportional to the square of the distance). That is, even in a case where the uncertainty of the bokeh value is equal, the uncertainty of the distance is larger as the distance corresponding to the bokeh value (distance converted from the bokeh value) is larger, and particularly, the uncertainty of the distance (estimation error) in a case where the distance to the subject is a long distance is large.

Therefore, in the present embodiment, the uncertainty of the bokeh value is converted into the uncertainty of the distance by using Equation (2) below, which is an approximate equation regarding the uncertainty of the bokeh value and the uncertainty of the distance in consideration of the relationship described above.

$$\delta u \approx \frac{Fu^2}{f^2} 2p\delta b \qquad \text{Equation (2)}$$

As expressed in Equation (2), uncertainty $\delta b$ of a bokeh value can be converted into uncertainty $\delta u$ of a distance by using a diaphragm value F, a distance u to the subject, a focal length f of the lens 201, and a pixel pitch p. The uncertainty $\delta u$ of the distance has a width with a unit of the same length as the distance u, and is based on the real scale.

Note that the pixel pitch p, an aperture diameter a of the diaphragm mechanism, a distance v between the lens 201 and the image sensor 202, the focal length f of the lens, and the diaphragm value F, used in Equations (1) and (2) are obtained in advance at the time when the time-series images are captured.

By executing the processing in Step S14, the distance acquisition module 32 can acquire the distance between feature points of the first image and the uncertainty of the distance.

Here, the distance converted from the bokeh value in Step S14 is used for estimating the position and orientation of the mobile object, but the distance affects the estimation accuracy of the position and orientation of the mobile object, and thus it cannot be said that a distance with large uncertainty is useful for the estimation.

Therefore, the extraction module 33 executes threshold processing based on the uncertainty of the distance converted from the uncertainty of the bokeh value in Step S14 (Step S15).

Specifically, the extraction module 33 extracts, as a useful distance, a distance of which uncertainty is less than a threshold (predetermined value) among the distances between the feature points of the first image. Note that, in Step S15, for example, processing of replacing a distance of which uncertainty is equal to or greater than a threshold with an invalid value may be executed.

When the processing of Step S15 is executed, the estimation module 34 calculates a three-dimensional coordinate of the feature point based on the distance (useful distance) between the feature points of the first image extracted by executing the processing of Step S15 (Step S16). In Step S16, processing of converting the coordinate of the feature point corresponding to the useful distance (camera coordinate on the first image) into the three-dimensional coordinate is executed by using the useful distance (that is, the distance that is not an invalid value) and an internal parameter (for example, a focal length or the like) of the capture device 2, the internal parameter being obtained in advance. Note that the three-dimensional coordinate of the feature point of the first image calculated in Step S16 represent a three-dimensional position based on a position (that is, the position of the mobile object when the first image is captured) serving as a starting point in a three-dimensional space in which the mobile object moves. Further, since the three-dimensional coordinate is calculated using the distance based on the real scale (distance converted from the bokeh value output from the statistical model), the three-dimensional coordinate is based on the real scale.

Note that, in a case where the processing of Steps S11 to S16 are executed, information on the feature point is held in the estimation device 3 for each feature point detected in Step S12. The information on the feature point includes a coordinate of the feature point on the first screen, a feature amount used for detecting the feature point, a distance between the feature points (distance converted from the bokeh value output from the statistical model for each feature point), and a three-dimensional coordinate of the feature point.

Next, the image acquisition module 31 acquires the second image included in the time-series images described above (Step S17). Note that the second image acquired in Step S17 is an image (for example, an image captured after capturing the first image) closest to the first image in time series manner, but may be, for example, an image including the same subject (feature point) as the first image.

When the processing in Step S17 is executed, the estimation module 34 detects a plurality of feature points (feature point group) from the second image acquired in Step S17 (Step S18). Note that the processing in Step S18 is processing corresponding to the processing in Step S12, and thus the detailed description thereof will be omitted here.

Next, the estimation module 34 selects, for example, the closest image (here, the first image acquired in Step S11) in time series manner among the images in which the feature points have already been detected, and performs association between the feature point detected from the first image (feature point of the first image) and the feature point detected from the second image (feature point of the second image). In this case, among the feature points of the first image, the feature point of which the three-dimensional coordinate is calculated in Step S16 is associated with the feature point of the second image. The association between the feature points can be performed using, for example, the distance between the feature amounts described above, but may be performed by another method.

The estimation module 34 estimates the position and orientation of the mobile object when the second image is captured by the capture device 2 by using a plurality of sets of the associated feature points as described above (Step S19). Note that, in Step S19, the position and orientation of the mobile object can be obtained, for example, by solving a perspective n-point (PnP) problem for the camera coordinate on the second image of the feature point of the second image (feature point associated with the feature point of the first image) and the three-dimensional coordinate of the feature point of the first image (feature point associated with the feature point of the second image) calculated in Step S16.

Note that the three-dimensional coordinate of the feature point of the first image used in Step S19 is based on the real scale as described above, and thus the position and orientation of the mobile object estimated in Step S19 is based on the real scale. As described above, when the first image is an image captured by the capture device 2 from the position serving as the starting position, the position and orientation of the mobile object estimated in Step S19 represents the position and orientation of the mobile object when the second image based on the position serving as the starting point is captured by the capture device 2 based on the real scale.

When the processing of Step S19 is executed, processing of Steps S20 to S23 corresponding to the processing of Steps S13 to S16 are executed for the second image.

Note that the three-dimensional coordinate calculated in Steps S16 and S23 illustrated in FIG. 19 can be used for creating a three-dimensional map in a technique called SLAM.

The estimation module 34 calculates a three-dimensional coordinate of the feature point based on the distance (useful distance) between the feature points of the second image extracted by executing the processing of Step S22 (Step S23). In Step S23, the processing of converting the coordinate of the feature point corresponding to the useful distance (camera coordinate on the second image) into the three-dimensional coordinate is executed by using the useful distance (that is, distance that is not an invalid value), the internal parameter (for example, the focal length or the like) of the capture device 2 obtained in advance, and the position and orientation of the mobile object when the second image is captured. Note that the three-dimensional coordinate of the feature point of the second image calculated in Step S23 represent a three-dimensional position based on a position (that is, the position of the mobile object when the second image is captured) serving as a starting point in a three-dimensional space in which the mobile object moves. Further, since the three-dimensional coordinate is calculated using the distance based on the real scale (distance converted from the bokeh value output from the statistical model), the three-dimensional coordinate is based on the real scale. Further, although the detailed description will be omitted, in a case where the processing of Steps S17 to S23 are executed for the second image described above, information on each of the feature points of the second image is held in the estimation device 3.

When the processing of Step S23 is executed, it is determined whether or not the processing has been executed for all the images included in the time-series images (Step S24).

In a case where it is determined that the processing is not executed for all the images included in the time-series images (NO in Step S24), the processing returns to Step S17 and the processing is repeated. In this case, in Step S17, an image captured after the second image described above is acquired as a new second image, and the processing after Step S18 is executed. Further, in Step S19 of this case, the position and orientation of the mobile object when the new second image is captured by the capture device 2 is estimated based on the closest image in time series manner among the images (that is, the image in which the three-dimensional coordinate of the feature point has already been calculated) in which the feature point have already been detected and the new second image acquired in Step S17 that has been repeatedly executed.

Meanwhile, in a case where it is determined that the processing is executed for all the images included in the time-series images (YES in Step S24), the processing in FIG. 19 is ended.

According to the processing in FIG. 19, it is possible to estimate the position and orientation of the mobile object based on the real scale at the time of capturing each image included in the continuously captured time-series images.

Note that, in FIG. 19, it has been described that the processing of Steps S13 and S20 are executed. However, for example, in a case where the time-series images are captured in advance by the capture device 2 and held in the estimation device 3, the processing of Steps S13 and S20 may be executed in advance as pre-processing before the processing in FIG. 19 is executed. According to such a configuration, it is possible to reduce a processing load of the estimation device 3 when estimating the position and orientation of the mobile object.

Further, in FIG. 19, it has been described that the processing in FIG. 19 is ended in a case where it is determined that the processing is executed for all the images included in the time-series images, but the processing in FIG. 19 may be ended, for example, in a case where the ending of the processing may be instructed (commanded) by an administrator of the estimation system 1, or may be ended at predetermined timing.

As described above, in the present embodiment, the first and second images (time-series images) including the same subject continuously calculated by the capture device 2 installed in the mobile object are acquired, a distance (first distance) to the subject included in the acquired first image and the uncertainty of the distance are acquired, a useful distance (second distance) is extracted from the distances based on the acquired uncertainty of the distance, and the position and orientation of the mobile object when the second image is captured by the capture device 2 is estimated based on the first and second images and (the three-dimensional coordinate calculated based on) the extracted useful distance.

In the present embodiment, with such a configuration, the position and orientation of the mobile object can be estimated with high accuracy.

Specifically, in the present embodiment, by executing the processing illustrated in FIG. 19, the position and orientation of the mobile object (capture device 2) at the time of capturing each image, for example, based on a world coordinate system with the position and orientation of the mobile object at the time of capturing an initial image of the time-series images as a reference is estimated based on the time-series images (a plurality of images captured continuously), but the position and orientation of the mobile object is estimated using the distance converted from the bokeh value indicating the bokeh that occurs in accordance with the subject in the image, and thus is based on the real scale from the viewpoint of accompanying a unit of length used in the real space. Note that the bokeh value indicating the bokeh that occurs in accordance with the subject in the image is acquired using the statistical model generated by learning the bokeh that occurs in the image affected by the aberration of the optical system of the capture device 2 and varies non-linearly in accordance with the distance to the subject included in the image.

Further, in the present embodiment, since the position and orientation of the mobile object described above is estimated using the useful distance (that is, a highly accurate distance in the distance space) extracted from the distance converted from the bokeh value, the accuracy of the estimated position and orientation of the mobile object can be improved.

Further, in the present embodiment, the distance to the subject and the uncertainty of the distance are acquired for each feature point (first feature point) detected from the first image, the three-dimensional coordinate of the feature point based on the real scale is calculated based on the useful distance extracted from the distances acquired for each feature point, and the position and orientation based on the real scale is estimated by associating the feature point for which the three-dimensional coordinate is calculated with a feature point (second feature point) detected from the second image.

In the present embodiment, since the three-dimensional coordinate of the feature point is directly calculated from the distance (distance converted from the bokeh value) in this manner, it is possible to obtain the three-dimensional coordinate from one image (that is, a three-dimensional map is created) without referring to another image by, for example, basic matrix estimation, triangulation, or the like. Note that, in a case where the scale of the three-dimensional map is indeterminate, it is difficult to perform application to using for generating a moving route of the mobile object by using the three-dimensional map. However, in the present embodiment, since the three-dimensional coordinate (three-dimensional map) based on a real scale with high accuracy can be obtained, the three-dimensional map can be applied to the use for generating the moving route.

That is, in the present embodiment, for example, even in a case where the number of images included in the time-series images is small, the three-dimensional coordinate can be calculated at high speed and robustly, and the position and orientation of the mobile object can be estimated with high accuracy.

Note that, in the present embodiment, it has been described that the position and orientation of the mobile object is estimated using (the three-dimensional coordinate calculated based on) the distance extracted based on the uncertainty of the distance converted from the uncertainty of the bokeh value. However, for example, it is also conceivable that the position and orientation of the mobile object is estimated using the distance converted from the bokeh value extracted based on the uncertainty of the bokeh value.

However, as described above, even in a case where the uncertainty of the bokeh is equal, the uncertainty of the distance is larger (uncertainty of the distance is proportional to the square of the distance) as the distance is larger. Therefore, in the present embodiment, the useful distance is extracted based on the uncertainty of the distance converted from the uncertainty of the bokeh value.

In the present embodiment, with such a configuration, for example, the distance (distance corresponding to the bokeh value), at which the uncertainty of the bokeh value is less than the threshold, but the uncertainty of the distance is equal to or greater than the threshold, is used for the estimation of the position and orientation of the mobile object, and thus it is possible to avoid a decrease in the estimation accuracy.

Meanwhile, in the present embodiment, it has been described that the distance to the subject and the uncertainty of the distance are acquired using the statistical model, but the distance and the uncertainty of the distance may be acquired by another method. Hereinafter, first and second modifications will be described as modifications of the present embodiment for acquisition of the distance to the subject and the uncertainty of the distance.

First, the first modification will be described. In the first modification, the distance to the subject and the uncertainty of the distance are acquired using a distance sensor such as light detection and ranging (LiDAR) (hereinafter, simply referred to as LiDAR). Note that LiDAR refers to, for example, a sensor used for receiving a reflected wave of laser light emitted to the subject from the subject to measure the distance to the subject based on the reflected wave.

In this case, the distance acquisition module 32 acquires the reflected wave received by LiDAR and intensity of the reflected wave (laser reflection intensity) at the same time that the image is captured by the capture device 2. In this case, the distance acquisition module 32 converts the acquired reflected wave into a distance to the subject, and converts the intensity of the reflected wave into uncertainty of the distance. Note that correspondence relationship between the intensity of the reflected wave and the uncertainty converted from the intensity of the reflected wave may be held (defined) in, for example, a table prepared in advance. In such a table, for example, the correspondence relationship only needs to be held in which the uncertainty increases in a case where the intensity of the reflected wave is low and the uncertainty decreases in a case where the intensity of the reflected wave is high.

Here, it has been described that the distance acquisition module 32 converts the reflected wave into the distance to the subject, but the distance acquisition module 32 may acquire, from LiDAR, the distance converted from the reflected wave (that is, the distance measured based on the reflected wave).

Note that processing other than acquiring the distance to the subject and the uncertainty of the distance by using LiDAR is similar to that of the present embodiment described above, and thus the detailed description thereof will be omitted here.

Here, it has been described that LiDAR that emits laser light is used, but the distance sensor that measures the distance to the subject by emitting an electromagnetic wave other than laser light may be used.

Further, in the first modification described above, LiDAR may be a part of the estimation system 1 (estimation device 3) or may be provided outside the estimation system 1 (estimation device 3).

First, the second modification will be described. In the second modification, for example, the distance to the subject and the uncertainty of the distance are acquired using a plurality of capture devices including the capture device 2. Note that the relative position and orientation between a plurality of capture devices (that is, the relationship between the distance and the orientation between a plurality of capture devices based on the real scale) used in the second modification is known.

In this case, the distance acquisition module 32 acquires at least two images (hereinafter, referred to as a stereo image) simultaneously captured by a plurality of capture devices (that is, from a plurality of viewpoints). Based on the acquired stereo image, the distance acquisition module 32 acquires a disparity in the stereo image and uncertainty of the disparity for each pixel configuring one image included in the stereo image. Note that the disparity in the stereo image is acquired by, for example, stereo corresponding point searching based on epipolar geometry. Further, in the second modification, for example, the distance acquisition module 32 holds in advance a table that holds a correspondence relationship between similarity of matching used in the stereo corresponding point searching and uncertainty (accuracy) of the disparity. The distance acquisition module 32 can acquire the uncertainty of the disparity from the similarity of matching by referring to such a table.

The distance acquisition module 32 calculates the distance to the subject based on a theoretical relationship between the disparity in the acquired stereo image and the distance to the subject. Further, the uncertainty of the disparity is converted into the uncertainty of the distance by an approximate equation prepared in advance such as Equation (2) described above.

Note that processing other than acquiring the distance to the subject and the uncertainty of the distance by using a plurality of capture devices is similar to that of the present embodiment described above, and thus the detailed description thereof will be omitted here.

Here, it has been described that the capture devices include the capture device 2, but in the second modification, the distance to the subject and the uncertainty of the distance may be acquired using, for example, a compound-eye camera separate from the capture device 2. The compound-eye camera in this case may be a part of the estimation system 1 (estimation device 3) or may be provided outside the estimation system 1 (estimation device 3).

As described above, in the present embodiment, the distance to the subject included in the image and the uncertainty of the distance may be acquired, and the present embodiment is not limited to the configuration in which the distance and the uncertainty of the distance are acquired using the statistical model described above.

Note that, in the present embodiment, it has been described that the distance in which the above-described uncertainty is less than the threshold is extracted as a useful distance, but the useful distance may be extracted using information other than the uncertainty of the distance.

Specifically, for example, the useful distance may be extracted based on the distance. In this case, it is possible to extract a distance that is less than the threshold as a useful distance based on the viewpoint that the uncertainty of the distance is larger as the distance is larger as described above.

Further, for example, each of the bokeh value described in the present embodiment, the reflected wave described in the first modification, and the disparity described in the second modification can be said to be information regarding the distance to the subject (hereinafter, referred to as distance information), and each of the uncertainty of the bokeh value described in the present embodiment, the intensity of the reflected wave described in the first modification, and the uncertainty of the disparity described in the second modification can be said to be uncertainty of the distance information. However, the useful distance may be extracted based on the distance information or the uncertainty of the distance information. In this case, for example, the bokeh value (size of the bokeh) or the distance in which the uncertainty of the bokeh value is less than a threshold (distance converted from the bokeh value) can be extracted as a useful distance.

Further, since the feature point is detected based on the luminance difference or the like as described above, in order to extract an appropriate distance between the feature points as the useful distance, the useful distance may be extracted based on the luminance.

As described above, in the present embodiment, the useful distance may be extracted based on the uncertainty of the distance and at least one of the distance, the distance information, the uncertainty of the distance information, and the luminance (information).

Second Embodiment

Next, a second embodiment will be described. Note that, in the present embodiment, descriptions of the same parts as those of the first embodiment described above will be omitted, and parts different from those of the first embodiment will be mainly described. Further, since a configuration of an estimation system (capture device and an estimation device) according to the present embodiment is similar to that of the first embodiment described above, the configuration will be appropriately described with reference to FIGS. 1 to 3.

The present embodiment is different from the first embodiment described above in that the position and orientation of the mobile object with an indeterminate scale estimated by executing a monocular SLAM processing using at least two images included in the time-series images captured by the capture device 2 (monocular camera) and the feature point detected from each of the two images is corrected (scale correction) using a useful distance.

Hereinafter, operation of the estimation device according to the present embodiment will be described. Note that, after executing initialization processing on two images among time-series images (a plurality of images captured continuously) captured by the capture device 2, the estimation device 3 according to the present embodiment operates so as to repeatedly execute tracking processing on, for example, an image captured after the image.

The exemplary initialization processing described above will be described with reference to a flowchart of FIG. 22. Similarly to the first embodiment described above, the capture device 2 installed in the mobile object continuously captures a plurality of images while the mobile object moves, and the image acquisition module 31 included in the estimation device 3 acquires a plurality of images continuously captured by the capture device 2 as the time-series images.

The image acquisition module 31 acquires first and second images included in the time-series images acquired as described above (Step S31). Note that the first and second images are, for example, two images closest in time series manner in the time-series images. Here, for example, it is assumed that the first image is an initial image of the time-series images and the second image is an image captured after the first image in time series manner.

When the processing in Step S31 is executed, the estimation module 34 detects a plurality of feature points (feature point group) from the first and second images acquired in Step S31 (Step S32). Note that the processing in Step S32 is the same processing as the processing in Step S12 illustrated in FIG. 19, and thus the detailed description thereof will be omitted here.

Next, the estimation module 34 estimates the position and orientation of the mobile object and the three-dimensional coordinate of the feature point of the second image when the second image is captured by the capture device 2 by associating the feature points of the first and second images detected in Step S32 (that is, based on the correspondence relationship of the feature points) (Step S33). The processing in Step S33 is executed using, for example, a basic matrix (basic matrix estimation by an 8-point algorithm) based on a set of coordinates (camera coordinates on the first and second images) of the associated feature points.

In Step S33, for example, the position and orientation of the mobile object when the second image is captured is estimated based on the position and orientation of the mobile object when the first image is captured, but the processing in Step S33 corresponds to the monocular SLAM processing described above. That is, the position and orientation of the mobile object estimated in Step S33 is not based on a unit of the real space, and the scale is indeterminate. The same applies to the three-dimensional coordinate estimated in Step S33.

When the processing of Step S33 is executed, processing of Steps S34 to S37 corresponding to the processing of Steps S20 to S23 illustrated in FIG. 19 are executed.

Next, the estimation module 34 determines a parameter (hereinafter, referred to as a scale correction parameter) for correcting the scale of the position and orientation of the mobile object estimated in Step S33 based on the three-dimensional coordinate (scale indetermination) of the feature point of the second image estimated in Step S33 and the three-dimensional coordinate (real scale) of the feature point of the second image calculated in Step S37 (Step S38). The scale correction parameter is determined such that an error between the three-dimensional coordinate obtained by multiplying the three-dimensional coordinate with the indeterminate scale estimated in Step S33 by the scale correction parameter and the three-dimensional coordinate based on the real scale calculated in Step S37 is minimized.

The estimation module 34 corrects the position and orientation of the mobile object to the position and orientation of the mobile object based on the real scale by multiplying a position (scale indetermination) of the mobile object estimated in Step S33 by the scale correction parameter determined in Step S38 (Step S39).

In a case where the initialization processing described above is executed, information on each feature point of the second image is held in the estimation device 3.

Note that, in FIG. 22, for convenience, it has been described that the processing of Steps S31 to S37 are sequentially executed. However, for example, the processing of Step S33 may be executed in parallel with the processing of Steps S34 to S37, or may be executed between the processing of Step S37 and the processing of Step S38.

Next, the exemplary tracking processing described above will be described with reference to a flowchart of FIG. 23. The image acquisition module 31 included in the estimation device 3 acquires a third image included in the time-series images captured by the capture device 2 (Step S41). Note that the third image is the closest image in time series manner to the second image in the initialization processing described above, and is, for example, an image captured after the second image.

When the processing in Step S41 is executed, the estimation module 34 detects a plurality of feature points (feature point group) from the third image acquired in Step S41 (Step S42). Note that the processing in Step S42 is the processing corresponding to the processing in Step S12 illustrated in FIG. 19, and thus the detailed description thereof will be omitted here.

Next, processing in Step S43 corresponding to the processing in Step S19 illustrated in FIG. 19 is executed. Note that, although the detailed description is omitted, in Step S43, the position and orientation of the mobile object based on the real scale when the third image is captured by the capture device 2 is estimated using (the camera coordinate of the feature point of) the third image and (the three-dimensional coordinate of the feature point of) the second image closest to the third image in time series manner.

When the processing of Step S43 is executed, the estimation module 34 calculates the three-dimensional coordinate (hereinafter, referred to as a first three-dimensional coordinate) of the feature point of the third image based on the principle of triangulation by using the position and orientation of the mobile object when the second image corrected in the initialization processing is captured and the position and orientation of the mobile object when the third image estimated in Step S43 is captured (Step S44). The processing of Step S44 is executed, for example, for a feature point that is not associated with the feature point of the second image (that is, in which the three-dimensional coordinate is not held). Note that the position and orientation of the mobile object when the second image is captured and the position and orientation of the mobile object when the third image estimated in Step S43 is captured are based on the real scale, and thus the first three-dimensional coordinate calculated in Step S44 are based on the real scale.

When the processing of Step S44 is executed, processing of Steps S45 to S48 corresponding to the processing of Steps S20 to S23 illustrated in FIG. 19 are executed for the third image. In the following description, the three-dimensional coordinate of the feature point of the third image calculated in Step S48 is referred to as a second three-dimensional coordinate for convenience.

Here, although the position and orientation of the mobile object estimated in Step S43 is based on the real scale, it is actually affected by an estimation error, and thus there is a possibility that the error is accumulated by repeatedly executing the processing for each image included in the time-series images, and the estimation accuracy of the position and orientation of the mobile object deteriorates (that is, scale drift occurs). Note that there is a possibility that an error similarly occurs in the first three-dimensional coordinate calculated in Step S44 by using the position and orientation of the mobile object.

Therefore, the estimation module 34 executes processing of Steps S49 and S50 corresponding to the processing of Steps S38 and S39 illustrated in FIG. 22.

That is, in Step S49, the scale correction parameter is determined based on the first three-dimensional coordinate calculated in Step S44 and the second three-dimensional coordinate calculated in Step S48. The scale correction parameter is determined such that an error between the three-dimensional coordinate obtained by multiplying the first three-dimensional coordinate calculated in Step S44 by the scale correction parameter and the second three-dimensional coordinate calculated in Step S48 is minimized.

Further, in Step S50, the position and orientation of the mobile object is corrected by multiplying the position of the mobile object estimated in Step S43 by the scale correction parameter determined in Step S49 (Step S50).

In a case where the processing of Step S50 is executed, processing of Step S51 corresponding to the processing of Step S24 illustrated in FIG. 19 is executed.

Note that, in a case where it is determined that the processing is not executed for all the images included in the time-series images in Step S51 (NO in Step S51), the processing returns to Step S41 and the processing is repeated. Note that, in Step S41 executed in this case, the image captured after the third image described above is acquired as a new third image, and the processing after Step S42 is executed. That is, the processing of Steps S41 to S50 illustrated in FIG. 23 are repeatedly executed for each image included in the time-series images.

According to the tracking processing in FIG. 23, it is possible to estimate the position and orientation of the mobile object based on the real scale at the time of capturing each image included in the continuously captured time-series images.

Note that, in FIG. 23, for convenience, it has been described that the processing of Steps S41 to S51 are sequentially executed, but for example, the processing of Steps S43 and S44 may be executed in parallel with the processing of Steps S45 to S48, or may be executed between the processing of Step S48 and the processing of Step S49.

As described above, in the present embodiment, the first and second images including the same subject continuously captured by the capture device 2 installed in the mobile object are acquired, a plurality of feature points are detected from the acquired first and second images, and the feature points detected from the first and second images are associated with each other, thereby estimating the position and orientation of the mobile object with an indeterminate scale when the second image is captured by the capture device 2. Further, in the present embodiment, a distance (first distance) to the subject included in the second image and uncertainty of the distance are acquired, a useful distance (second distance) is extracted from the distances based on the acquired uncertainty of the distance, and the position and orientation of the mobile object with the indeterminate scale described above is corrected to the position and orientation of the mobile object based on the real scale based on (the three-dimensional coordinate calculated based on) the extracted second distance.

In the present embodiment, with such a configuration, it is possible to estimate the position and orientation of the mobile object based on the real scale at the time of capturing each image with high accuracy based on the continuously captured time-series images.

Further, in the present embodiment, since the position and orientation of the mobile object is sequentially corrected based on the useful distance (three-dimensional coordinate) also in the tracking processing described above, the scale drift described above can be avoided.

Note that, in the present embodiment, it has been described that the position and orientation of the mobile object with an indeterminate scale and the three-dimensional coordinate of the feature point are estimated based on correspondence relationship of the feature points. However, in the present embodiment, the position and orientation of the mobile object with the indeterminate scale may be estimated by another method as long as the three-dimensional coordinate of the feature point used for the scale correction can be obtained.

Further, in the present embodiment, it has been described that the processing of Steps S41 to S50 illustrated in FIG. 23 is repeatedly executed for each image included in the time-series images, but the processing for correcting the scale (processing of Steps S49 and S50) need not be executed for all the images (that is, need not be executed for each frame), and may be executed only for a predetermined image (that is, for each predetermined frame interval). The interval at which the processing of correcting the scale is executed may be dynamically changed (determined) based on, for example, a movement amount of the mobile object (capture device 2).

Further, the first and second modifications described in the first embodiment described above may be applied to the present embodiment.

According to at least one embodiment described above, it is possible to provide an estimation device capable of estimating a position and orientation of a mobile object with high accuracy, a method, and a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation device comprising:
a processor configured to:
  acquire first and second images including a same subject continuously captured by a capture device installed in a mobile object;
  acquire a first distance to the subject included in the acquired first image and uncertainty of the first distance;
  extract a second distance from the acquired first distance based on the acquired uncertainty of the first distance; and
  estimate a position and orientation of the mobile object when the second image is captured by the capture device based on the acquired first and second images, and the extracted second distance.

2. The estimation device according to claim 1, wherein the processor is configured to:
  acquire a bokeh value indicating bokeh occurring in the subject in the first image and uncertainty of the bokeh value as distance information regarding the first distance to the subject and uncertainty of the distance information;
  convert the bokeh value into the first distance corresponding to the bokeh value; and
  convert the uncertainty of the bokeh value into the uncertainty of the first distance corresponding to the bokeh value.

3. The estimation device according to claim 2, wherein when the first image is input into a statistical model generated by learning bokeh that occurs in an image affected by an aberration of an optical system of the capture device and varies non-linearly in accordance with a distance to the subject included in the image, the bokeh value and the uncertainty of the bokeh value are output from the statistical model.

4. The estimation device according to claim 1, wherein the processor is configured to:
  acquire a reflected wave from the subject and intensity of the reflected wave as distance information regarding the first distance to the subject and uncertainty of the distance information;
  convert the reflected wave into the first distance to the subject corresponding to the reflected wave; and
  convert the intensity of the reflected wave into the uncertainty of the first distance converted from the reflected wave.

5. The estimation device according to claim 1, wherein the processor is configured to:
  acquire disparity in an image including the subject captured from a plurality of viewpoints by at least two capture devices and uncertainty of the disparity as distance information regarding the first distance to the subject and uncertainty of the distance information;
  convert the disparity into the first distance corresponding to the disparity; and
  convert the uncertainty of the disparity into the uncertainty of the first distance corresponding to the disparity.

6. The estimation device according to claim 2, wherein the processor is configured to extract the second distance based on at least one of the uncertainty of the first distance, the first distance, the distance information, the uncertainty of the distance information, and luminance of the first image.

7. The estimation device according to claim 1, wherein the processor is configured to extract, as the second distance, the first distance in which the uncertainty is less than a predetermined value.

8. The estimation device according to claim 1, wherein the processor is configured to:
  detect a plurality of first feature points from the first image and detect a plurality of second feature points from the second image;
  acquire the first distance to the subject and the uncertainty of the first distance for each of the first feature points;
  extract the second distance from the first distance acquired for each of the first feature points based on the acquired uncertainty of the first distance;
  calculate a three-dimensional coordinate of the first feature point based on a real scale based on the extracted second distance; and
  estimate the position and orientation of the mobile object based on the real scale by associating the first feature point for which the three-dimensional coordinate is calculated with the second feature point detected from the second image.

9. An estimation device comprising:
a processor configured to:
  acquire first and second images including a same subject continuously captured by a capture device installed in a mobile object;
  estimate a position and orientation of the mobile object with an indeterminate scale when the second image is captured by the capture device by detecting a plurality of feature points from the acquired first and second images and associating the feature points detected from the first and second images;
  acquire a first distance to the subject included in the acquired second image and uncertainty of the first distance;
  extract a second distance from the acquired first distance based on the acquired uncertainty of the first distance; and correct, based on the extracted second distance, the estimated position and orientation of the mobile object with the indeterminate scale to the position and orientation of the mobile object based on a real scale.

10. The estimation device according to claim 9, wherein the processor is configured to:
acquire a bokeh value indicating bokeh occurring in the subject in the second image and uncertainty of the bokeh value as distance information regarding the first distance to the subject and uncertainty of the distance information;
convert the bokeh value into the first distance corresponding to the bokeh value; and
convert the uncertainty of the bokeh value into the uncertainty of the first distance corresponding to the bokeh value.

11. The estimation device according to claim 10, wherein when the second image is input into a statistical model generated by learning bokeh that occurs in an image affected by an aberration of an optical system of the capture device and varies non-linearly in accordance with a distance to the subject included in the image, the bokeh value and the uncertainty of the bokeh value are output from the statistical model.

12. The estimation device according to claim 9, wherein the processor is configured to:
acquire a reflected wave from the subject and intensity of the reflected wave as distance information regarding the first distance to the subject and uncertainty of the distance information;
convert the reflected wave into the first distance to the subject corresponding to the reflected wave; and
convert the intensity of the reflected wave into the uncertainty of the first distance converted from the reflected wave.

13. The estimation device according to claim 9, wherein the processor is configured to:
acquire disparity in an image including the subject captured from a plurality of viewpoints by at least two capture devices and uncertainty of the disparity as distance information regarding the first distance to the subject and uncertainty of the distance information;
convert the disparity into the first distance corresponding to the disparity; and
convert the uncertainty of the disparity into the uncertainty of the first distance corresponding to the disparity.

14. The estimation device according to claim 10, wherein the processor is configured to extract the second distance based on at least one of the uncertainty of the first distance, the first distance, the distance information, the uncertainty of the distance information, and luminance of the first image.

15. The estimation device according to claim 10, wherein the processor is configured to extract, as the second distance, the first distance in which the uncertainty is less than a predetermined value.

16. A method, executed by an estimation device, comprising:
acquiring first and second images including a same subject continuously captured by a capture device installed in a mobile object;
acquiring a first distance to the subject included in the acquired first image and uncertainty of the first distance;
extracting a second distance from the acquired first distance based on the acquired uncertainty of the first distance; and
estimating a position and orientation of the mobile object when the second image is captured by the capture device based on the acquired first and second images, and the extracted second distance.

17. The method according to claim 16, wherein the acquiring of the first distance and the uncertainty of the first distance includes:
acquiring a bokeh value indicating bokeh occurring in the subject in the first image and uncertainty of the bokeh value as distance information regarding the first distance to the subject and uncertainty of the distance information;
converting the bokeh value into the first distance corresponding to the bokeh value; and
converting the uncertainty of the bokeh value into the uncertainty of the first distance corresponding to the bokeh value.

18. The method according to claim 17, wherein when the first image is input into a statistical model generated by learning bokeh that occurs in an image affected by an aberration of an optical system of the capture device and varies non-linearly in accordance with a distance to the subject included in the image, the bokeh value and the uncertainty of the bokeh value are output from the statistical model.

19. The method according to claim 16, wherein the acquiring of the first distance and the uncertainty of the first distance includes:
acquiring a reflected wave from the subject and intensity of the reflected wave as distance information regarding the first distance to the subject and uncertainty of the distance information;
converting the reflected wave into the first distance to the subject corresponding to the reflected wave; and
converting the intensity of the reflected wave into the uncertainty of the first distance converted from the reflected wave.

20. The method according to claim 16, wherein the acquiring of the first distance and the uncertainty of the first distance includes:
acquiring disparity in an image including the subject captured from a plurality of viewpoints by at least two capture devices and uncertainty of the disparity as distance information regarding the first distance to the subject and uncertainty of the distance information;
converting the disparity into the first distance corresponding to the disparity; and
converting the uncertainty of the disparity into the uncertainty of the first distance corresponding to the disparity.

* * * * *